US012666108B2

(12) United States Patent
Calatayud

(10) Patent No.: US 12,666,108 B2
(45) Date of Patent: Jun. 23, 2026

(54) MEDIA PLAYBACK SYSTEMS WITH AUXILIARY AUDIOVISUAL INPUTS

(71) Applicant: Sonos, Inc., Goleta, CA (US)

(72) Inventor: Thomas Calatayud, Plymouth, MA (US)

(73) Assignee: Sonos, Inc., Goleta, CA (US)

( * ) Notice: Subject to any disclaimer, the term of this patent is extended or adjusted under 35 U.S.C. 154(b) by 427 days.

(21) Appl. No.: 18/192,528

(22) Filed: Mar. 29, 2023

(65) Prior Publication Data

US 2023/0319344 A1 Oct. 5, 2023

Related U.S. Application Data

(60) Provisional application No. 63/362,185, filed on Mar. 30, 2022.

(51) Int. Cl.
*H04N 21/439* (2011.01)
*H04N 21/43* (2011.01)
*H04N 21/4363* (2011.01)

(52) U.S. Cl.
CPC ..... *H04N 21/4394* (2013.01); *H04N 21/4307* (2013.01); *H04N 21/43635* (2013.01)

(58) Field of Classification Search
CPC .......... H04N 21/4394; H04N 21/4307; H04N 21/43635; H04N 21/43615; H04N 21/8106
See application file for complete search history.

(56) References Cited

U.S. PATENT DOCUMENTS

| | | | |
|---|---|---|---|
| 5,440,644 A | 8/1995 | Farinelli et al. |
| 5,761,320 A | 6/1998 | Farinelli et al. |
| 5,923,902 A | 7/1999 | Inagaki |
| 6,032,202 A | 2/2000 | Lea et al. |
| 6,256,554 B1 | 7/2001 | DiLorenzo |
| 6,404,811 B1 | 6/2002 | Cvetko et al. |

(Continued)

FOREIGN PATENT DOCUMENTS

| | | |
|---|---|---|
| EP | 1389853 A1 | 2/2004 |
| WO | 200153994 | 7/2001 |
| WO | 2003093950 A2 | 11/2003 |

OTHER PUBLICATIONS

AudioTron Quick Start Guide, Version 1.0, Mar. 2001, 24 pages.

(Continued)

*Primary Examiner* — Carolyn R Edwards
(74) *Attorney, Agent, or Firm* — Fortem IP LLP

(57) ABSTRACT

Disclosed herein are computing devices, including playback devices, that are configured to operate in several media distribution modes and play back audio data in several playback modes based at least in part on the source of audio/video data for playback. IN one example, a playback device receives, via a first hardware interface, an input stream of audiovisual content comprising first audio data and video data. The playback device tags the first audio data and transmits the tagged audio data along with the video data to a video display device. The playback device then receives, via second hardware interface from the video display device, a second audio data stream. The second stream is evaluated to identify a tag, after which the playback device plays back the first audio data in substantial synchrony with the video data while suppressing playback of the second audio data.

21 Claims, 17 Drawing Sheets

(56) References Cited

U.S. PATENT DOCUMENTS

| | | | |
|---|---|---|---|
| 6,469,633 B1 | 10/2002 | Wachter | |
| 6,522,886 B1 | 2/2003 | Youngs et al. | |
| 6,611,537 B1 | 8/2003 | Edens et al. | |
| 6,631,410 B1 | 10/2003 | Kowalski et al. | |
| 6,757,517 B2 | 6/2004 | Chang | |
| 6,778,869 B2 | 8/2004 | Champion | |
| 7,130,608 B2 | 10/2006 | Hollstrom et al. | |
| 7,130,616 B2 | 10/2006 | Janik | |
| 7,143,939 B2 | 12/2006 | Henzerling | |
| 7,236,773 B2 | 6/2007 | Thomas | |
| 7,295,548 B2 | 11/2007 | Blank et al. | |
| 7,391,791 B2 | 6/2008 | Balassanian et al. | |
| 7,483,538 B2 | 1/2009 | McCarty et al. | |
| 7,571,014 B1 | 8/2009 | Lambourne et al. | |
| 7,630,501 B2 | 12/2009 | Blank et al. | |
| 7,643,894 B2 | 1/2010 | Braithwaite et al. | |
| 7,657,910 B1 | 2/2010 | McAulay et al. | |
| 7,853,341 B2 | 12/2010 | McCarty et al. | |
| 7,987,294 B2 | 7/2011 | Bryce et al. | |
| 8,014,423 B2 | 9/2011 | Thaler et al. | |
| 8,045,952 B2 | 10/2011 | Qureshey et al. | |
| 8,103,009 B2 | 1/2012 | McCarty et al. | |
| 8,234,395 B2 | 7/2012 | Millington | |
| 8,483,853 B1 | 7/2013 | Lambourne | |
| 8,942,252 B2 | 1/2015 | Balassanian et al. | |
| 2001/0042107 A1 | 11/2001 | Palm | |
| 2002/0022453 A1 | 2/2002 | Balog et al. | |
| 2002/0026442 A1 | 2/2002 | Lipscomb et al. | |
| 2002/0034376 A1* | 3/2002 | Katayama | H04N 21/4334 |
| | | | 704/E21.017 |
| 2002/0124097 A1 | 9/2002 | Isely et al. | |
| 2003/0157951 A1 | 8/2003 | Hasty, Jr. | |
| 2004/0024478 A1 | 2/2004 | Hans et al. | |
| 2007/0142944 A1 | 6/2007 | Goldberg et al. | |
| 2016/0203824 A1* | 7/2016 | Park | H04N 21/8358 |
| | | | 700/94 |
| 2020/0257490 A1* | 8/2020 | McKently | H04N 21/8106 |
| 2021/0329165 A1* | 10/2021 | Liu | H04R 1/34 |
| 2022/0321948 A1* | 10/2022 | Cai | H04N 21/4307 |

OTHER PUBLICATIONS

AudioTron Reference Manual, Version 3.0, May 2002, 70 pages.

AudioTron Setup Guide, Version 3.0, May 2002, 38 pages.

Bluetooth. "Specification of the Bluetooth System: The ad hoc Scatternet for affordable and highly functional wireless connectivity," Core, Version 1.0 A, Jul. 26, 1999, 1068 pages.

Bluetooth. "Specification of the Bluetooth System: Wireless connections made easy," Core, Version 1.0 B, Dec. 1, 1999, 1076 pages.

Dell, Inc. "Dell Digital Audio Receiver: Reference Guide," Jun. 2000, 70 pages.

Dell, Inc. "Start Here," Jun. 2000, 2 pages.

"Denon 2003-2004 Product Catalog," Denon, 2003-2004, 44 pages.

Jo et al., "Synchronized One-to-many Media Streaming with Adaptive Playout Control," Proceedings of SPIE, 2002, pp. 71-82, vol. 4861.

Jones, Stephen, "Dell Digital Audio Receiver: Digital upgrade for your analog stereo," Analog Stereo, Jun. 24, 2000 http://www.reviewsonline.com/articles/961906864.htm retrieved Jun. 18, 2014, 2 pages.

Louderback, Jim, "Affordable Audio Receiver Furnishes Homes With MP3," TechTV Vault. Jun. 28, 2000 retrieved Jul. 10, 2014, 2 pages.

Palm, Inc., "Handbook for the Palm VII Handheld," May 2000, 311 pages.

Presentations at WinHEC 2000, May 2000, 138 pages.

Sonos, Inc. v. D&M Holdings (No. 14-1330-RGA), DI 219, Claim Construction Opinion (Jan. 12, 2017) (24 pages).

United States Patent and Trademark Office, U.S. Appl. No. 60/490,768, filed Jul. 28, 2003, entitled "Method for synchronizing audio playback between multiple networked devices," 13 pages.

United States Patent and Trademark Office, U.S. Appl. No. 60/825,407, filed Sep. 12, 2006, entitled "Controlling and manipulating groupings in a multi-zone music or media system," 82 pages.

UPnP; "Universal Plug and Play Device Architecture," Jun. 8, 2000; version 1.0; Microsoft Corporation; pp. 1-54.

Yamaha DME 64 Owner's Manual; copyright 2004, 80 pages.

Yamaha DME Designer 3.5 setup manual guide; copyright 2004, 16 pages.

Yamaha DME Designer 3.5 User Manual; Copyright 2004, 507 pages.

* cited by examiner

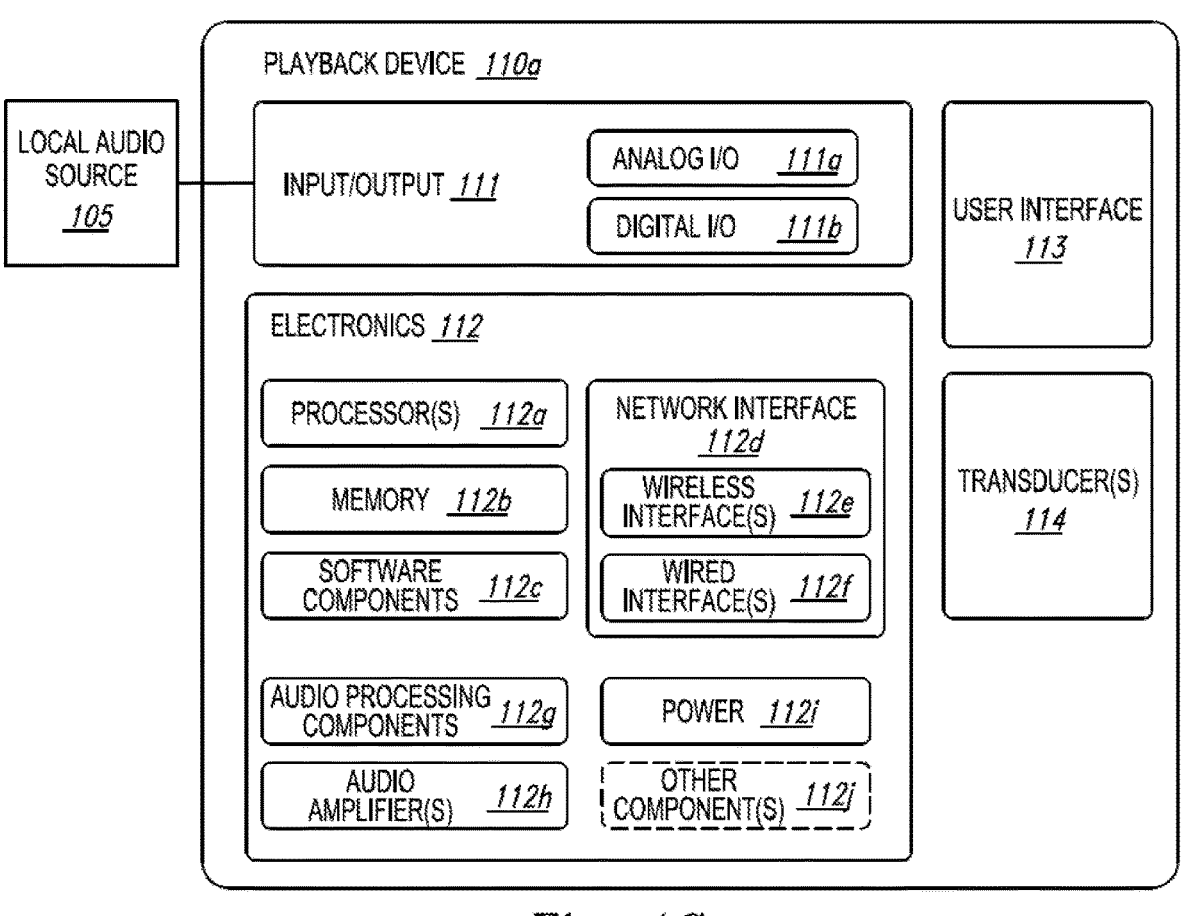
Fig. 1C
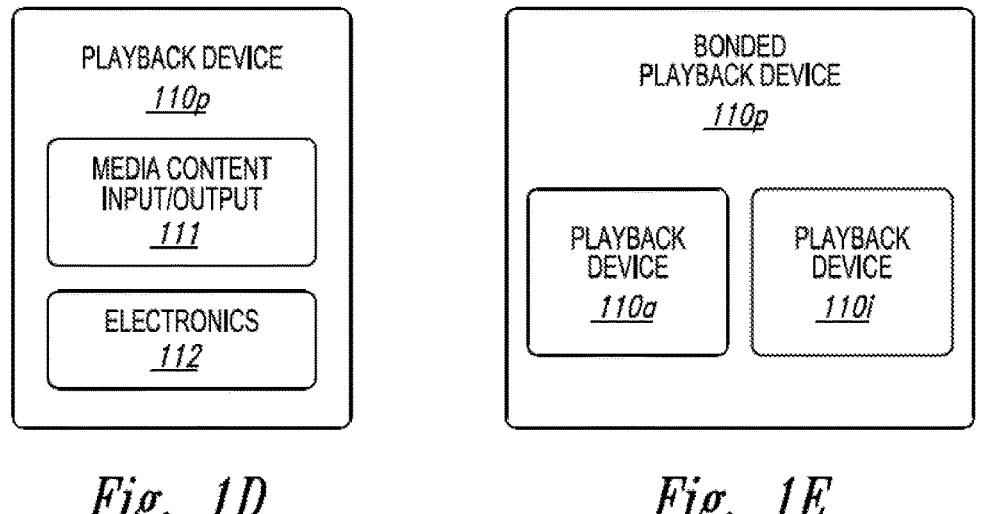
Fig. 1D                 Fig. 1E

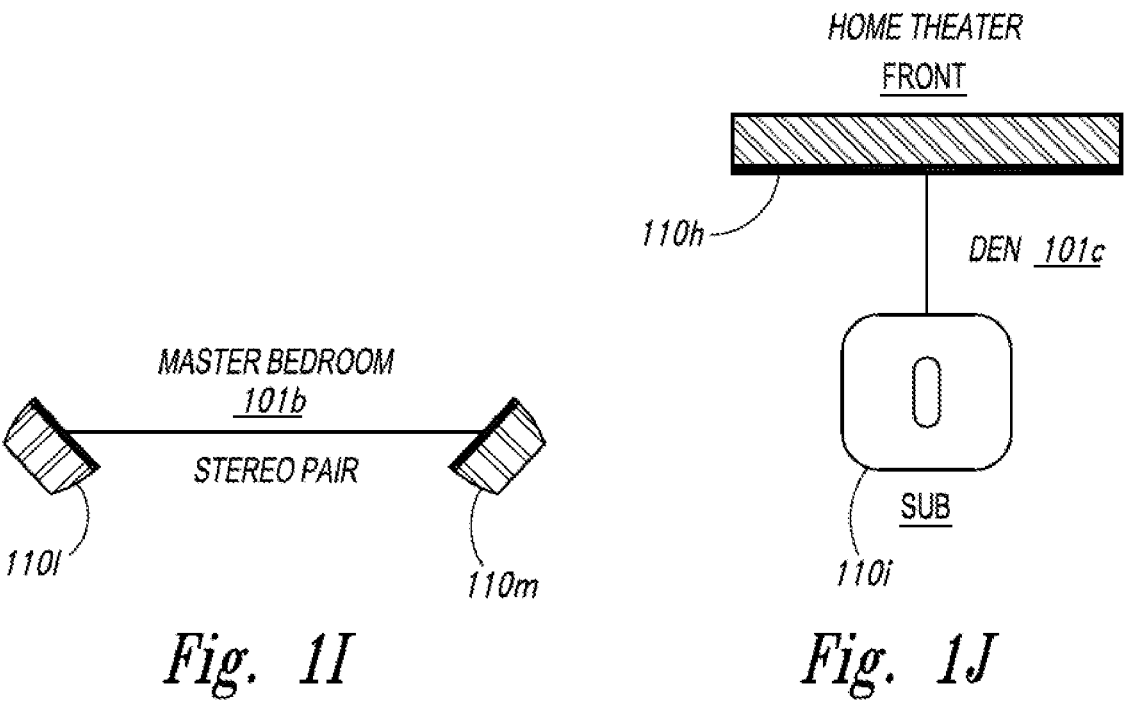
*Fig. 1I*
*Fig. 1J*
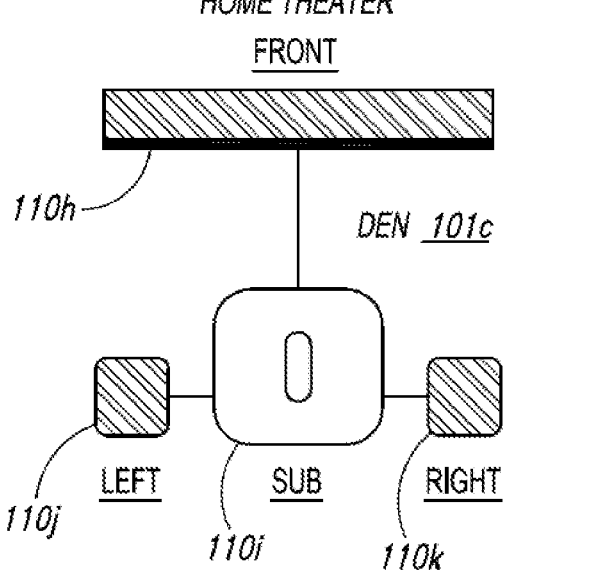
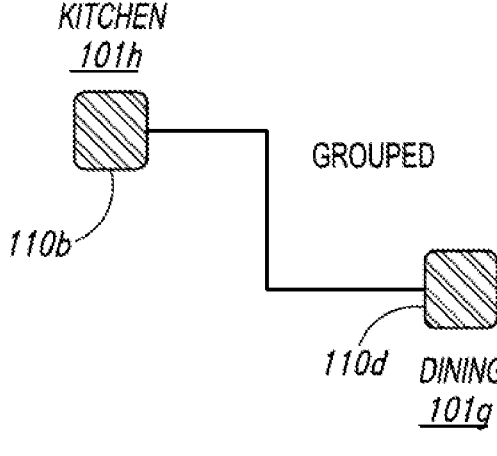
*Fig. 1K*
*Fig. 1L*

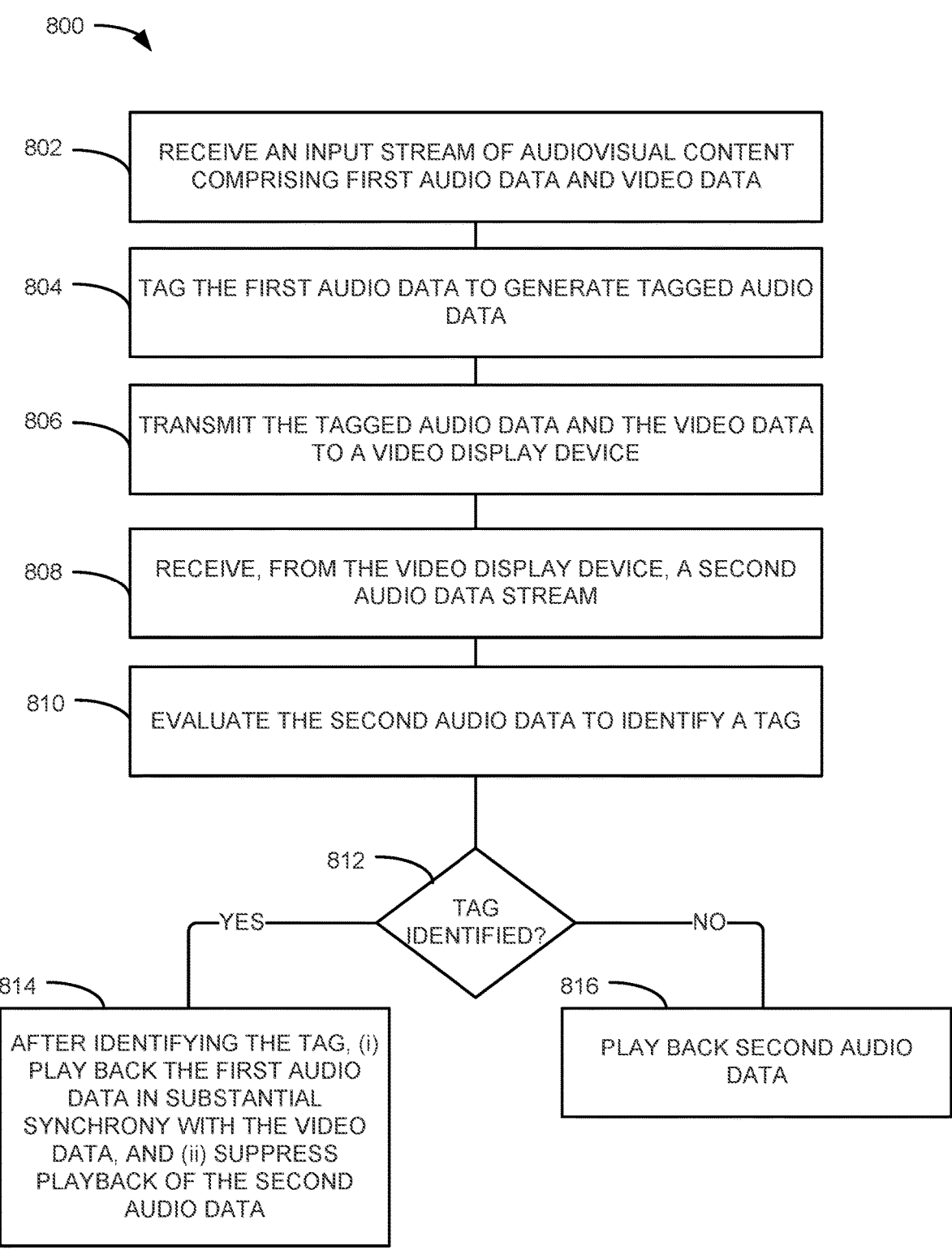

800

802 — RECEIVE AN INPUT STREAM OF AUDIOVISUAL CONTENT COMPRISING FIRST AUDIO DATA AND VIDEO DATA

804 — TAG THE FIRST AUDIO DATA TO GENERATE TAGGED AUDIO DATA

806 — TRANSMIT THE TAGGED AUDIO DATA AND THE VIDEO DATA TO A VIDEO DISPLAY DEVICE

808 — RECEIVE, FROM THE VIDEO DISPLAY DEVICE, A SECOND AUDIO DATA STREAM

810 — EVALUATE THE SECOND AUDIO DATA TO IDENTIFY A TAG

812 — TAG IDENTIFIED?

YES

NO

814 — AFTER IDENTIFYING THE TAG, (i) PLAY BACK THE FIRST AUDIO DATA IN SUBSTANTIAL SYNCHRONY WITH THE VIDEO DATA, AND (ii) SUPPRESS PLAYBACK OF THE SECOND AUDIO DATA

816 — PLAY BACK SECOND AUDIO DATA

Fig. 8

MEDIA PLAYBACK SYSTEMS WITH AUXILIARY AUDIOVISUAL INPUTS

CROSS-REFERENCE TO RELATED APPLICATION

This application claims the benefit of priority to U.S. Patent Application No. 63/362,185, filed Mar. 20, 2022, which is incorporated herein by reference in its entirety.

FIELD OF THE DISCLOSURE

The present disclosure is related to consumer goods and, more particularly, to methods, systems, products, features, services, and other elements directed to media playback or some aspect thereof.

BACKGROUND

Options for accessing and listening to digital audio in an out-loud setting were limited until in 2002, when SONOS, Inc. began development of a new type of playback system. Sonos then filed one of its first patent applications in 2003, entitled "Method for Synchronizing Audio Playback between Multiple Networked Devices," and began offering its first media playback systems for sale in 2005. The Sonos Wireless Home Sound System enables people to experience music from many sources via one or more networked playback devices. Through a software control application installed on a controller (e.g., smartphone, tablet, computer, voice input device), one can play what she wants in any room having a networked playback device. Media content (e.g., songs, podcasts, video sound) can be streamed to playback devices such that each room with a playback device can play back corresponding different media content. In addition, rooms can be grouped together for synchronous playback of the same media content, and/or the same media content can be heard in all rooms synchronously.

BRIEF DESCRIPTION OF THE DRAWINGS

Features, aspects, and advantages of the presently disclosed technology may be better understood with regard to the following description, appended claims, and accompanying drawings, as listed below. A person skilled in the relevant art will understand that the features shown in the drawings are for purposes of illustrations, and variations, including different and/or additional features and arrangements thereof, are possible.

FIG. 1C shows a block diagram of a playback device.

FIG. 1D shows a block diagram of a playback device.

FIG. 1E shows a block diagram of a network microphone device.

FIGS. 1-I through 1L show schematic diagrams of corresponding media playback system zones.

FIG. 8 shows an example method for playback of audiovisual content according to some embodiments.

Figure 1A:
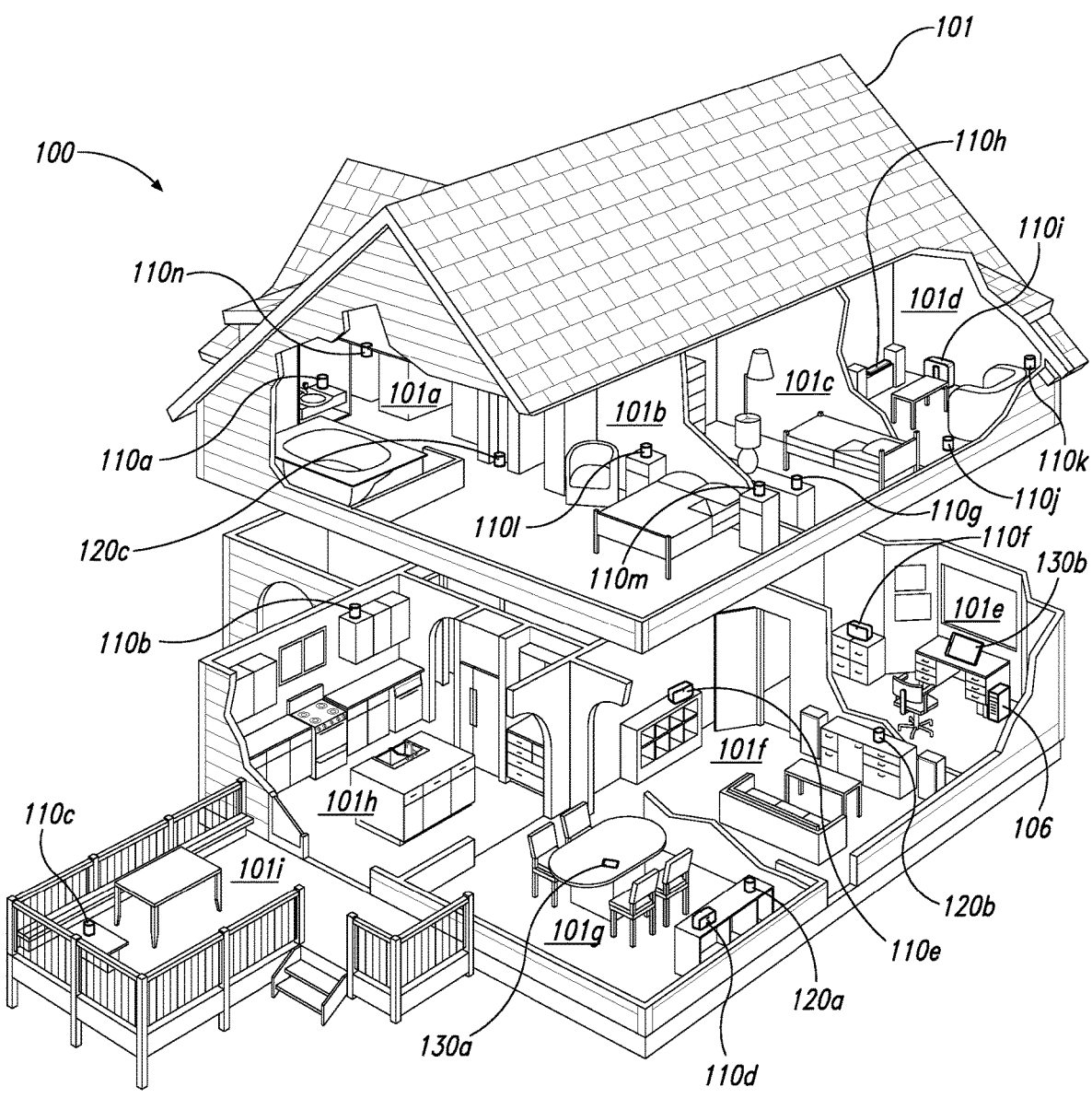
FIG. 1A shows a partial cutaway view of an environment having a media playback system configured in accordance with aspects of the disclosed technology.

The drawings are for the purpose of illustrating example embodiments, but those of ordinary skill in the art will understand that the technology disclosed herein is not limited to the arrangements and/or instrumentality shown in the drawings.

DETAILED DESCRIPTION

I. Overview

One common issue associated with home theater audio is ensuring that the correct format is provided to the soundbar and/or other audio playback devices. Many televisions do not properly transmit home theater audio from the audio source (e.g., streaming media box, Blu Ray player) either because of lack of requisite hardware or non-compliant implementation of particular standards. For instance, some televisions do not send Dolby Atmos passthrough audio to the soundbar because they either a) lack eARC (extended Audio Return Channel) support or b) implement eARC improperly. This can lead to user frustration, particularly if the television claims to support the hardware interface (i.e., eARC) or the format (e.g., Dolby Atmos). Moreover, the user may not be able to identify the problem source and thus may incorrectly blame the streaming service or the soundbar when the television is the culprit.

In some instances, it can be beneficial for an audio playback device to take other approaches. For example, when there is an audio playback device in which one or more of the individuals interacting with the playback device are cooperatively interacting, the coordinator playback device can transmit signals to one or more satellite playback devices One approach is to provide an audio playback device (e.g., a soundbar or other suitable device) that includes an auxiliary High-Definition Multimedia Interface (HDMI) port configured to receive video and audio from a media source. The received video is transmitted to a display device (e.g., a television) while the received audio is directly pulled from the HDMI input (rather than from the television). This approach may only work, however, if the display device only plays back media from the media source connected to the auxiliary input. If, for example, the user selects a different source via the display device, the soundbar may have no way of knowing a) that the audio source has changed and b) that the soundbar should start playing back audio received from the display device rather than the auxiliary input.

Examples of the technology address these and other shortcomings. For example, a playback device (e.g., a soundbar) can be configured to receive audio and video from a third-party media source (e.g., streaming media player, Blu Ray player, DVD player) as noted above. The playback device transmits the received audio and video to the display device and also receives audio from the display device. In at least some examples, the playback device compares the audio received from the television and the audio received directly from the third-party media source. If the audio substantially matches (indicating that the audio source selected for the television is the same as the media source providing audiovisual content to the playback device), then the playback device plays the audio directly from the media source rather than from the television. Otherwise, the playback device plays back the audio received from the television.

In some embodiments, the playback device is configured to add a tag, watermark, or other suitable indicator to third-party audio content that is sent to the display device along with the accompanying video content. The tagged audio may include, for instance, a stereo downmix of the audio received from the media source, a test tone, an inaudible artifact, or any other suitable indicator. The playback device can analyze the audio sent from the display device via the HDMI ARC and determine whether it detects the tagged signal. When the tag is detected, the playback device may play audio directly from the HDMI input source (e.g., Dolby Atmos content received from a Blu Ray player), while discarding the return audio received from the display device.

The approaches described above are expected to have at least an advantage of removing reliance on the display device to provide the highest quality audio available (e.g., Dolby Atmos) for media received via the third-party media source. Additional advantages may include reducing latency or conversely adding delay buffers on the video to offset a delay associated with transmitting the audio to Bluetooth headphones.

Moreover, there may be a diagnostic aspect as well. For example, if a high quality, multichannel audio signal is received directly from the media source, but the display device (playing back the same source) returns a lower quality or lower channel (e.g., stereo) version, the playback device may alert the user that display device may have one or more incorrect settings, and may also suggest one or more steps to remedy the problem.

While some examples described herein may refer to functions performed by given actors such as "users," "listeners," and/or other entities, it should be understood that this is for purposes of explanation only. The claims should not be interpreted to require action by any such example actor unless explicitly required by the language of the claims themselves.

In the Figures, identical reference numbers identify generally similar, and/or identical, elements. To facilitate the discussion of any particular element, the most significant digit or digits of a reference number refers to the Figure in which that element is first introduced. For example, element 110a is first introduced and discussed with reference to FIG. 1A. Many of the details, dimensions, angles and other features shown in the Figures are merely illustrative of particular embodiments of the disclosed technology. Accordingly, other embodiments can have other details, dimensions, angles and features without departing from the spirit or scope of the disclosure. In addition, those of ordinary skill in the art will appreciate that further embodiments of the various disclosed technologies can be practiced without several of the details described below.

II. Suitable Operating Environment

FIG. 1A is a partial cutaway view of a media playback system 100 distributed in an environment 101 (e.g., a house). The media playback system 100 comprises one or more playback devices 110 (identified individually as playback devices 110a-n), one or more network microphone devices ("NMDs"), 120 (identified individually as NMDs 120a-c), and one or more control devices 130 (identified individually as control devices 130a and 130b).

As used herein the term "playback device" can generally refer to a network device configured to receive, process, and output data of a media playback system. For example, a playback device can be a network device that receives and processes audio data. In some embodiments, a playback device includes one or more transducers or speakers powered by one or more amplifiers. In other embodiments, however, a playback device includes one of (or neither of) the speaker and the amplifier. For instance, a playback device can comprise one or more amplifiers configured to drive one or more speakers external to the playback device via a corresponding wire or cable.

Moreover, as used herein the term NMD (i.e., a "network microphone device") can generally refer to a network device that is configured for audio detection. In some embodiments, an NMD is a stand-alone device configured primarily for audio detection. In other embodiments, an NMD is incorporated into a playback device (or vice versa).

The term "control device" can generally refer to a network device configured to perform functions relevant to facilitating user access, control, and/or configuration of the media playback system 100.

Each of the playback devices 110 is configured to receive audio signals or data from one or more media sources (e.g., one or more remote servers, one or more local devices) and play back the received audio signals or data as sound. The one or more NMDs 120 are configured to receive spoken word commands, and the one or more control devices 130 are configured to receive user input. In response to the received spoken word commands and/or user input, the media playback system 100 can play back audio via one or more of the playback devices 110. In certain embodiments, the playback devices 110 are configured to commence playback of media content in response to a trigger. For instance, one or more of the playback devices 110 can be configured to play back a morning playlist upon detection of an associated trigger condition (e.g., presence of a user in a kitchen, detection of a coffee machine operation). In some embodiments, for example, the media playback system 100 is configured to play back audio from a first playback device (e.g., the playback device 100a) in synchrony with a second playback device (e.g., the playback device 100b). Interactions between the playback devices 110, NMDs 120, and/or control devices 130 of the media playback system 100 configured in accordance with the various embodiments of the disclosure are described in greater detail below with respect to FIGS. 1B-1L.

In the illustrated embodiment of FIG. 1A, the environment 101 comprises a household having several rooms, spaces, and/or playback zones, including (clockwise from upper left) a master bathroom 101*a*, a master bedroom 101*b*, a second bedroom 101*c*, a family room or den 101*d*, an office 101*e*, a living room 101*f*, a dining room 101*g*, a kitchen 101*h*, and an outdoor patio 101*i*. While certain embodiments and examples are described below in the context of a home environment, the technologies described herein may be implemented in other types of environments. In some embodiments, for example, the media playback system 100 can be implemented in one or more commercial settings (e.g., a restaurant, mall, airport, hotel, a retail or other store), one or more vehicles (e.g., a sports utility vehicle, bus, car, a ship, a boat, an airplane), multiple environments (e.g., a combination of home and vehicle environments), and/or another suitable environment where multi-zone audio may be desirable.

The media playback system 100 can comprise one or more playback zones, some of which may correspond to the rooms in the environment 101. The media playback system 100 can be established with one or more playback zones, after which additional zones may be added, or removed to form, for example, the configuration shown in FIG. 1A. Each zone may be given a name according to a different room or space such as the office 101*e*, master bathroom 101*a*, master bedroom 101*b*, the second bedroom 101*c*, kitchen 101*h*, dining room 101*g*, living room 101*f*, and/or the patio 101*i*. In some aspects, a single playback zone may include multiple rooms or spaces. In certain aspects, a single room or space may include multiple playback zones.

In the illustrated embodiment of FIG. 1A, the master bathroom 101*a*, the second bedroom 101*c*, the office 101*e*, the living room 101*f*, the dining room 101*g*, the kitchen 101*h*, and the outdoor patio 101*i* each include one playback device 110, and the master bedroom 101*b* and the den 101*d* include a plurality of playback devices 110. In the master bedroom 101*b*, the playback devices 110*l* and 110*m* may be configured, for example, to play back audio data in synchrony as individual ones of playback devices 110, as a bonded playback zone, as a consolidated playback device, and/or any combination thereof. Similarly, in the den 101*d*, the playback devices 110*h-j* can be configured, for instance, to play back audio data in synchrony as individual ones of playback devices 110, as one or more bonded playback devices, and/or as one or more consolidated playback devices. Additional details regarding bonded and consolidated playback devices are described below with respect to, for example, FIGS. 1B and 1E and 1I-1M.

In some aspects, one or more of the playback zones in the environment 101 may each be playing different audio data. For instance, a user may be grilling on the patio 101*i* and listening to hip hop music being played by the playback device 110*c* while another user is preparing food in the kitchen 101*h* and listening to classical music played by the playback device 110*b*. In another example, a playback zone may play the same audio data in synchrony with another playback zone. For instance, the user may be in the office 101*e* listening to the playback device 110*f* playing back the same hip hop music being played back by playback device 110*c* on the patio 101*i*. In some aspects, the playback devices 110*c* and 110*f* play back the hip hop music in synchrony such that the user perceives that the audio data is being played seamlessly (or at least substantially seamlessly) while moving between different playback zones. Additional details regarding audio playback synchronization among playback devices and/or zones can be found, for example, in U.S. Pat. No. 8,234,395 entitled, "System and method for synchronizing operations among a plurality of independently clocked digital data processing devices," which is incorporated herein by reference in its entirety.

a. Suitable Media Playback System

Figure 1B:
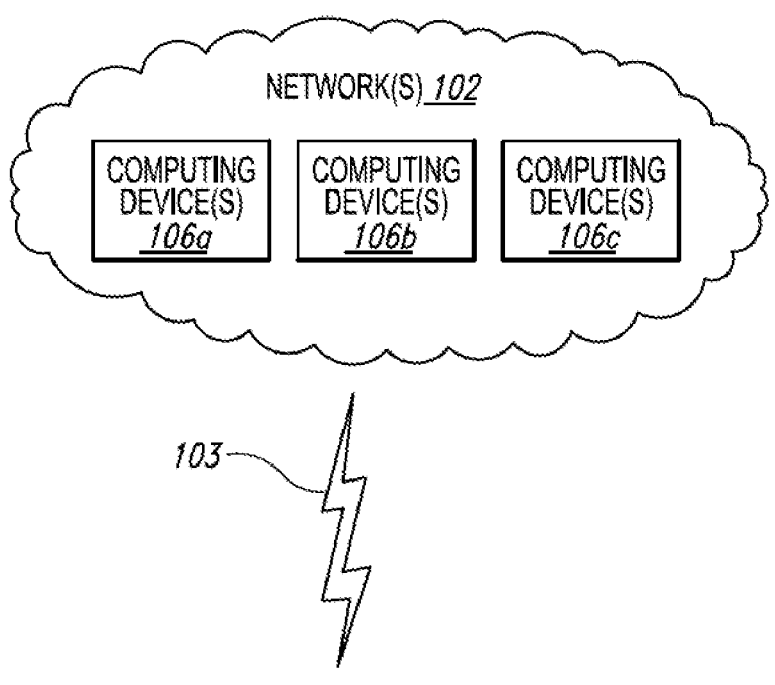
FIG. 1B shows a schematic diagram of the media playback system of FIG. 1A and one or more networks.
Figure 1B:
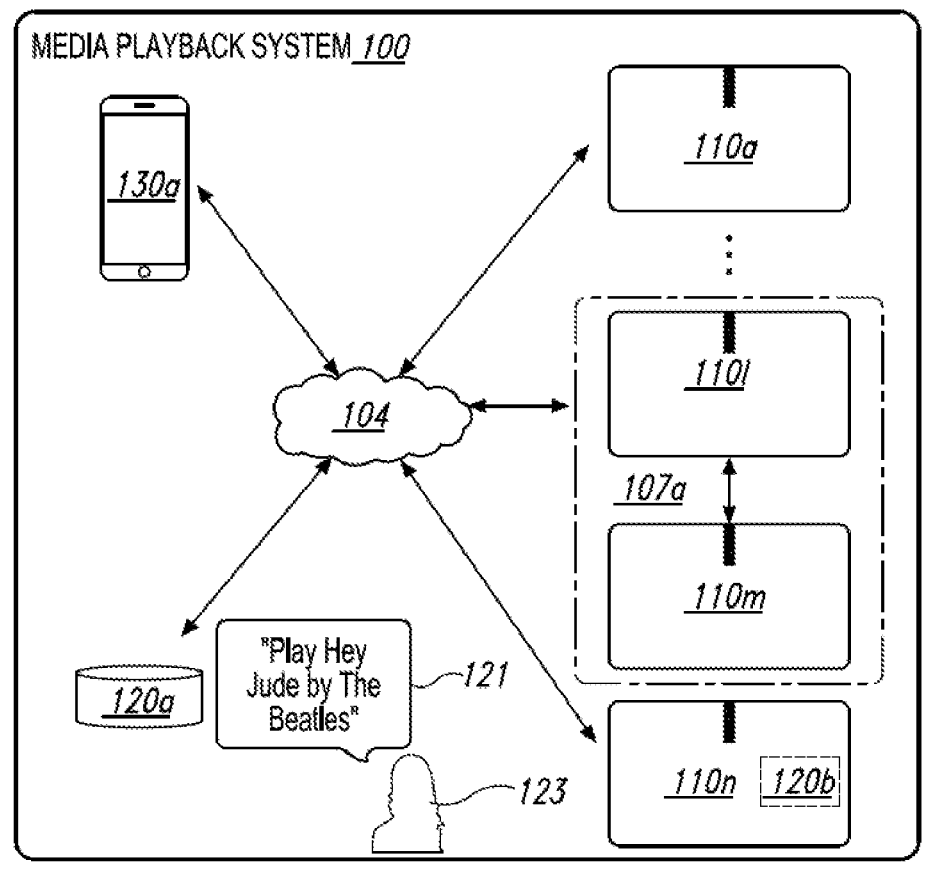

FIG. 1B is a schematic diagram of the media playback system 100 and a cloud network 102. For ease of illustration, certain devices of the media playback system 100 and the cloud network 102 are omitted from FIG. 1B. One or more communication links 103 (referred to hereinafter as "the links 103") communicatively couple the media playback system 100 and the cloud network 102.

The links 103 can comprise, for example, one or more wired networks, one or more wireless networks, one or more wide area networks (WAN), one or more local area networks (LAN), one or more personal area networks (PAN), one or more telecommunication networks (e.g., one or more Global System for Mobiles (GSM) networks, Code Division Multiple Access (CDMA) networks, Long-Term Evolution (LTE) networks, 5G communication network networks, and/or other suitable data transmission protocol networks), etc. The cloud network 102 is configured to deliver media content (e.g., audio data, video data, photographs, social media content) to the media playback system 100 in response to a request transmitted from the media playback system 100 via the links 103. In some embodiments, the cloud network 102 is further configured to receive data (e.g. voice input data) from the media playback system 100 and correspondingly transmit commands and/or media content to the media playback system 100.

The cloud network 102 comprises computing devices 106 (identified separately as a first computing device 106*a*, a second computing device 106*b*, and a third computing device 106*c*). The computing devices 106 can comprise individual computers or servers, such as, for example, a media streaming service server storing audio and/or other media content, a voice service server, a social media server, a media playback system control server, etc. In some embodiments, one or more of the computing devices 106 comprise modules of a single computer or server. In certain embodiments, one or more of the computing devices 106 comprise one or more modules, computers, and/or servers. Moreover, while the cloud network 102 is described above in the context of a single cloud network, in some embodiments the cloud network 102 comprises a plurality of cloud networks comprising communicatively coupled computing devices. Furthermore, while the cloud network 102 is shown in FIG. 1B as having three of the computing devices 106, in some embodiments, the cloud network 102 comprises fewer (or more than) three computing devices 106.

The media playback system 100 is configured to receive media content from the networks 102 via the links 103. The received media content can comprise, for example, a Uniform Resource Identifier (URI) and/or a Uniform Resource Locator (URL). For instance, in some examples, the media playback system 100 can stream, download, or otherwise obtain data from a URI or a URL corresponding to the received media content. A network 104 communicatively couples the links 103 and at least a portion of the devices (e.g., one or more of the playback devices 110, NMDs 120, and/or control devices 130) of the media playback system 100. The network 104 can include, for example, a wireless network (e.g., a WiFi network, a Bluetooth, a Z-Wave network, a ZigBee, and/or other suitable wireless communication protocol network) and/or a wired network (e.g., a network comprising Ethernet, Universal Serial Bus (USB), and/or another suitable wired communication). As those of ordinary skill in the art will appreciate, as used herein, "WiFi" can refer to several different communication protocols including, for example, Institute of Electrical and Electronics Engineers (IEEE) 802.11a, 802.11b, 802.11g, 802.11n, 802.11ac, 802.11ac, 802.11ad, 802.11af, 802.11ah, 802.11ai, 802.11aj, 802.11aq, 802.11ax, 802.11ay, 802.15, etc. transmitted at 2.4 Gigahertz (GHz), 5 GHz, and/or another suitable frequency.

In some embodiments, the network 104 comprises a dedicated communication network that the media playback system 100 uses to transmit messages between individual devices and/or to transmit media content to and from media content sources (e.g., one or more of the computing devices 106). In certain embodiments, the network 104 is configured to be accessible only to devices in the media playback system 100, thereby reducing interference and competition with other household devices. In other embodiments, however, the network 104 comprises an existing household communication network (e.g., a household WiFi network). In some embodiments, the links 103 and the network 104 comprise one or more of the same networks. In some aspects, for example, the links 103 and the network 104 comprise a telecommunication network (e.g., an LTE network, a 5G network). Moreover, in some embodiments, the media playback system 100 is implemented without the network 104, and devices comprising the media playback system 100 can communicate with each other, for example, via one or more direct connections, PANs, telecommunication networks, and/or other suitable communication links.

In some embodiments, audio data sources may be regularly added or removed from the media playback system 100. In some embodiments, for example, the media playback system 100 performs an indexing of media items when one or more media content sources are updated, added to, and/or removed from the media playback system 100. The media playback system 100 can scan identifiable media items in some or all folders and/or directories accessible to the playback devices 110, and generate or update a media content database comprising metadata (e.g., title, artist, album, track length) and other associated information (e.g., URIs, URLs) for each identifiable media item found. In some embodiments, for example, the media content database is stored on one or more of the playback devices 110, network microphone devices 120, and/or control devices 130.

In the illustrated embodiment of FIG. 1B, the playback devices 110*l* and 110*m* comprise a group 107*a*. The playback devices 110*l* and 110*m* can be positioned in different rooms in a household and be grouped together in the group 107*a* on a temporary or permanent basis based on user input received at the control device 130*a* and/or another control device 130 in the media playback system 100. When arranged in the group 107*a*, the playback devices 110*l* and 110*m* can be configured to play back the same or similar audio data in synchrony from one or more audio content sources. In certain embodiments, for example, the group 107*a* comprises a bonded zone in which the playback devices 110*l* and 110*m* comprise left audio and right audio channels, respectively, of multi-channel audio content, thereby producing or enhancing a stereo effect of the audio content. In some embodiments, the group 107*a* includes additional playback devices 110. In other embodiments, however, the media playback system 100 omits the group 107*a* and/or other grouped arrangements of the playback devices 110. Additional details regarding groups and other arrangements of playback devices are described in further detail below with respect to FIGS. 1-I through IM.

The media playback system 100 includes the NMDs 120*a* and 120*d*, each comprising one or more microphones configured to receive voice utterances from a user. In the illustrated embodiment of FIG. 1B, the NMD 120*a* is a standalone device and the NMD 120*d* is integrated into the playback device 110*n*. The NMD 120*a*, for example, is configured to receive voice input 121 from a user 123. In some embodiments, the NMD 120*a* transmits data associated with the received voice input 121 to a voice assistant service (VAS) configured to (i) process the received voice input data and (ii) transmit a corresponding command to the media playback system 100. In some aspects, for example, the computing device 106*c* comprises one or more modules and/or servers of a VAS (e.g., a VAS operated by one or more of SONOS®, AMAZON®, GOOGLE® APPLE®, MICROSOFT®). The computing device 106*c* can receive the voice input data from the NMD 120*a* via the network 104 and the links 103. In response to receiving the voice input data, the computing device 106*c* processes the voice input data (i.e., "Play Hey Jude by The Beatles"), and determines that the processed voice input includes a command to play a song (e.g., "Hey Jude"). The computing device 106*c* accordingly transmits commands to the media playback system 100 to play back "Hey Jude" by the Beatles from a suitable media service (e.g., via one or more of the computing devices 106) on one or more of the playback devices 110.

b. Suitable Playback Devices

FIG. 1C is a block diagram of the playback device 110*a* comprising an input/output 111. The input/output 111 can include an analog I/O 111*a* (e.g., one or more wires, cables, and/or other suitable communication links configured to carry analog signals) and/or a digital I/O 111*b* (e.g., one or more wires, cables, or other suitable communication links configured to carry digital signals). In some embodiments, the analog I/O 111*a* is an audio line-in input connection comprising, for example, an auto-detecting 3.5 mm audio line-in connection. In some embodiments, the digital I/O 111*b* comprises a Sony/Philips Digital Interface Format (S/PDIF) communication interface and/or cable and/or a Toshiba Link (TOSLINK) cable. In some embodiments, the digital I/O 111*b* comprises an High-Definition Multimedia Interface (HDMI) interface and/or cable. In some embodiments, the digital I/O 111*b* includes one or more wireless communication links comprising, for example, a radio frequency (RF), infrared, WiFi, Bluetooth, or another suitable communication protocol. In certain embodiments, the analog I/O 111*a* and the digital I/O 111*b* comprise interfaces (e.g., ports, plugs, jacks) configured to receive connectors of cables transmitting analog and digital signals, respectively, without necessarily including cables.

The playback device 110*a*, for example, can receive media content (e.g., audio data comprising music and/or other sounds) from a local audio source 105 via the input/output 111 (e.g., a cable, a wire, a PAN, a Bluetooth connection, an ad hoc wired or wireless communication network, and/or another suitable communication link). The local audio source 105 can comprise, for example, a mobile device (e.g., a smartphone, a tablet, a laptop computer) or another suitable audio component (e.g., a television, a desktop computer, an amplifier, a phonograph, a Blu Ray player, a memory storing digital media files). In some aspects, the local audio source 105 includes local music libraries on a smartphone, a computer, a networked-attached storage (NAS), and/or another suitable device configured to store media files. In certain embodiments, one or more of the playback devices 110, NMDs 120, and/or control devices 130 comprise the local audio source 105. In other embodiments, however, the media playback system omits the local audio source 105 altogether. In some embodiments, the playback device 110a does not include an input/output 111 and receives all audio data via the network 104.

The playback device 110a further comprises electronics 112, a user interface 113 (e.g., one or more buttons, knobs, dials, touch-sensitive surfaces, displays, touchscreens), and one or more transducers 114 (referred to hereinafter as "the transducers 114"). The electronics 112 is configured to receive audio from an audio source (e.g., the local audio source 105) via the input/output 111, one or more of the computing devices 106a-c via the network 104 (FIG. 1B)), amplify the received audio, and output the amplified audio for playback via one or more of the transducers 114. In some embodiments, the playback device 110a optionally includes one or more microphones 115 (e.g., a single microphone, a plurality of microphones, a microphone array) (hereinafter referred to as "the microphones 115"). In certain embodiments, for example, the playback device 110a having one or more of the optional microphones 115 can operate as an NMD configured to receive voice input from a user and correspondingly perform one or more operations based on the received voice input.

In the illustrated embodiment of FIG. 1C, the electronics 112 comprise one or more processors 112a (referred to hereinafter as "the processors 112a"), memory 112b, software components 112c, a network interface 112d, one or more audio processing components 112g (referred to hereinafter as "the audio components 112g"), one or more audio amplifiers 112h (referred to hereinafter as "the amplifiers 112h"), and power 112i (e.g., one or more power supplies, power cables, power receptacles, batteries, induction coils, Power-over Ethernet (POE) interfaces, and/or other suitable sources of electric power). In some embodiments, the electronics 112 optionally include one or more other components 112j (e.g., one or more sensors, video displays, touchscreens, battery charging bases).

The processors 112a can comprise clock-driven computing component(s) configured to process data, and the memory 112b can comprise a computer-readable medium (e.g., a tangible, non-transitory computer-readable medium, data storage loaded with one or more of the software components 112c) configured to store instructions for performing various operations and/or functions. The processors 112a are configured to execute the instructions stored on the memory 112b to perform one or more of the operations. The operations can include, for example, causing the playback device 110a to retrieve audio information from an audio source (e.g., one or more of the computing devices 106a-c (FIG. 1B)), and/or another one of the playback devices 110. In some embodiments, the operations further include causing the playback device 110a to send audio information to another one of the playback devices 110a and/or another device (e.g., one of the NMDs 120). Certain embodiments include operations causing the playback device 110a to pair with another of the one or more playback devices 110 to enable a multi-channel audio environment (e.g., a stereo pair, a bonded zone).

The processors 112a can be further configured to perform operations causing the playback device 110a to synchronize playback of audio data with another of the one or more playback devices 110. As those of ordinary skill in the art will appreciate, during synchronous playback of audio data on a plurality of playback devices, a listener will preferably be unable to perceive time-delay differences between playback of the audio data by the playback device 110a and the other one or more other playback devices 110. Additional details regarding audio playback synchronization among playback devices can be found, for example, in U.S. Pat. No. 8,234,395, which was incorporated by reference above.

In some embodiments, the memory 112b is further configured to store data associated with the playback device 110a, such as one or more zones and/or zone groups of which the playback device 110a is a member, audio sources accessible to the playback device 110a, and/or a playback queue that the playback device 110a (and/or another of the one or more playback devices) can be associated with. The stored data can comprise one or more state variables that are periodically updated and used to describe a state of the playback device 110a. The memory 112b can also include data associated with a state of one or more of the other devices (e.g., the playback devices 110, NMDs 120, control devices 130) of the media playback system 100. In some aspects, for example, the state data is shared during predetermined intervals of time (e.g., every 5 seconds, every 10 seconds, every 60 seconds) among at least a portion of the devices of the media playback system 100, so that one or more of the devices have the most recent data associated with the media playback system 100.

The network interface 112d is configured to facilitate a transmission of data between the playback device 110a and one or more other devices on a data network such as, for example, the links 103 and/or the network 104 (FIG. 1B). The network interface 112d is configured to transmit and receive data corresponding to media content (e.g., audio data, video data, text, photographs) and other signals (e.g., non-transitory signals) comprising digital packet data including an Internet Protocol (IP)-based source address and/or an IP-based destination address. The network interface 112d can parse the digital packet data such that the electronics 112 properly receives and processes the data destined for the playback device 110a.

In the illustrated embodiment of FIG. 1C, the network interface 112d comprises one or more wireless interfaces 112e (referred to hereinafter as "the wireless interface 112e"). The wireless interface 112e (e.g., a suitable interface comprising one or more antennae) can be configured to wirelessly communicate with one or more other devices (e.g., one or more of the other playback devices 110, NMDs 120, and/or control devices 130) that are communicatively coupled to the network 104 (FIG. 1B) in accordance with a suitable wireless communication protocol (e.g., WiFi, Bluetooth, LTE). In some embodiments, the network interface 112d optionally includes a wired interface 112f (e.g., an interface or receptacle configured to receive a network cable such as an Ethernet, a USB-A, USB-C, and/or Thunderbolt cable) configured to communicate over a wired connection with other devices in accordance with a suitable wired communication protocol. In certain embodiments, the network interface 112d includes the wired interface 112f and excludes the wireless interface 112e. In some embodiments, the electronics 112 excludes the network interface 112d altogether and transmits and receives media content and/or other data via another communication path (e.g., the input/output 111).

The audio processing components 112g are configured to process and/or filter data comprising media content received by the electronics 112 (e.g., via the input/output 111 and/or the network interface 112d) to produce output audio signals. In some embodiments, the audio processing components 112$g$ comprise, for example, one or more digital-to-analog converters (DAC), audio preprocessing components, audio enhancement components, a digital signal processors (DSPs), and/or other suitable audio processing components, modules, circuits, etc. In certain embodiments, one or more of the audio processing components 112$g$ can comprise one or more subcomponents of the processors 112$a$. In some embodiments, the electronics 112 omits the audio processing components 112$g$. In some aspects, for example, the processors 112$a$ execute instructions stored on the memory 112$b$ to perform audio processing operations to produce the output audio signals.

The amplifiers 112$h$ are configured to receive and amplify the audio output signals produced by the audio processing components 112$g$ and/or the processors 112$a$. The amplifiers 112$h$ can comprise electronic devices and/or components configured to amplify audio signals to levels sufficient for driving one or more of the transducers 114. In some embodiments, for example, the amplifiers 112$h$ include one or more switching or class-D power amplifiers. In other embodiments, however, the amplifiers include one or more other types of power amplifiers (e.g., linear gain power amplifiers, class-A amplifiers, class-B amplifiers, class-AB amplifiers, class-C amplifiers, class-D amplifiers, class-E amplifiers, class-F amplifiers, class-G and/or class H amplifiers, and/or another suitable type of power amplifier). In certain embodiments, the amplifiers 112$h$ comprise a suitable combination of two or more of the foregoing types of power amplifiers. Moreover, in some embodiments, individual ones of the amplifiers 112$h$ correspond to individual ones of the transducers 114. In other embodiments, however, the electronics 112 includes a single one of the amplifiers 112$h$ configured to output amplified audio signals to a plurality of the transducers 114. In some other embodiments, the electronics 112 omits the amplifiers 112$h$.

The transducers 114 (e.g., one or more speakers and/or speaker drivers) receive the amplified audio signals from the amplifier 112$h$ and render or output the amplified audio signals as sound (e.g., audible sound waves having a frequency between about 20 Hertz (Hz) and 20 kilohertz (kHz)). In some embodiments, the transducers 114 can comprise a single transducer. In other embodiments, however, the transducers 114 comprise a plurality of audio transducers. In some embodiments, the transducers 114 comprise more than one type of transducer. For example, the transducers 114 can include one or more low frequency transducers (e.g., subwoofers, woofers), mid-range frequency transducers (e.g., mid-range transducers, mid-woofers), and one or more high frequency transducers (e.g., one or more tweeters). As used herein, "low frequency" can generally refer to audible frequencies below about 500 Hz, "mid-range frequency" can generally refer to audible frequencies between about 500 Hz and about 2 kHz, and "high frequency" can generally refer to audible frequencies above 2 kHz. In certain embodiments, however, one or more of the transducers 114 comprise transducers that do not adhere to the foregoing frequency ranges. For example, one of the transducers 114 may comprise a mid-woofer transducer configured to output sound at frequencies between about 200 Hz and about 5 kHz.

By way of illustration, SONOS, Inc. presently offers (or has offered) for sale certain playback devices including, for example, a "SONOS ONE," "PLAY:1," "PLAY:3," "PLAY: 5," "PLAYBAR," "PLAYBASE," "CONNECT:AMP," "CONNECT," and "SUB." Other suitable playback devices may additionally or alternatively be used to implement the playback devices of example embodiments disclosed herein.

Additionally, one of ordinary skilled in the art will appreciate that a playback device is not limited to the examples described herein or to SONOS product offerings. In some embodiments, for example, one or more playback devices 110 comprises wearable playback devices, such as wired or wireless headphones (e.g., over-the-ear headphones, on-ear headphones, in-ear earphones), smartglasses with integrated audio transducers, or any other suitable wearable playback devices. In other embodiments, one or more of the playback devices 110 comprise a docking station and/or an interface configured to interact with a docking station for personal mobile media playback devices. In certain embodiments, a playback device may be integral to another device or component such as a television, a lighting fixture, or some other device for indoor or outdoor use. In some embodiments, a playback device omits a user interface and/or one or more transducers. For example, FIG. 1D is a block diagram of a playback device 110$p$ comprising the input/output 111 and electronics 112 without the user interface 113 or transducers 114.

FIG. 1E is a block diagram of a bonded playback device 110$q$ comprising the playback device 110$a$ (FIG. 1C) sonically bonded with the playback device 110$i$ (e.g., a subwoofer) (FIG. 1A). In the illustrated embodiment, the playback devices 110$a$ and 110$i$ are separate ones of the playback devices 110 housed in separate enclosures. In some embodiments, however, the bonded playback device 110$q$ comprises a single enclosure housing both the playback devices 110$a$ and 110$i$. The bonded playback device 110$q$ can be configured to process and reproduce sound differently than an unbonded playback device (e.g., the playback device 110$a$ of FIG. 1C) and/or paired or bonded playback devices (e.g., the playback devices 110$l$ and 110$m$ of FIG. 1B). In some embodiments, for example, the playback device 110$a$ is full-range playback device configured to render low frequency, mid-range frequency, and high frequency audio content, and the playback device 110$i$ is a subwoofer configured to render low frequency audio content. In some aspects, the playback device 110$a$, when bonded with the first playback device, is configured to render only the mid-range and high frequency components of a particular audio content, while the playback device 110$i$ renders the low frequency component of the particular audio content. In some embodiments, the bonded playback device 110$q$ includes additional playback devices and/or another bonded playback device. Additional playback device embodiments are described in further detail below with respect to FIGS. 2A-3D.

c. Suitable Network Microphone Devices (NMDs)

Figures 1F, 1G, 1H:
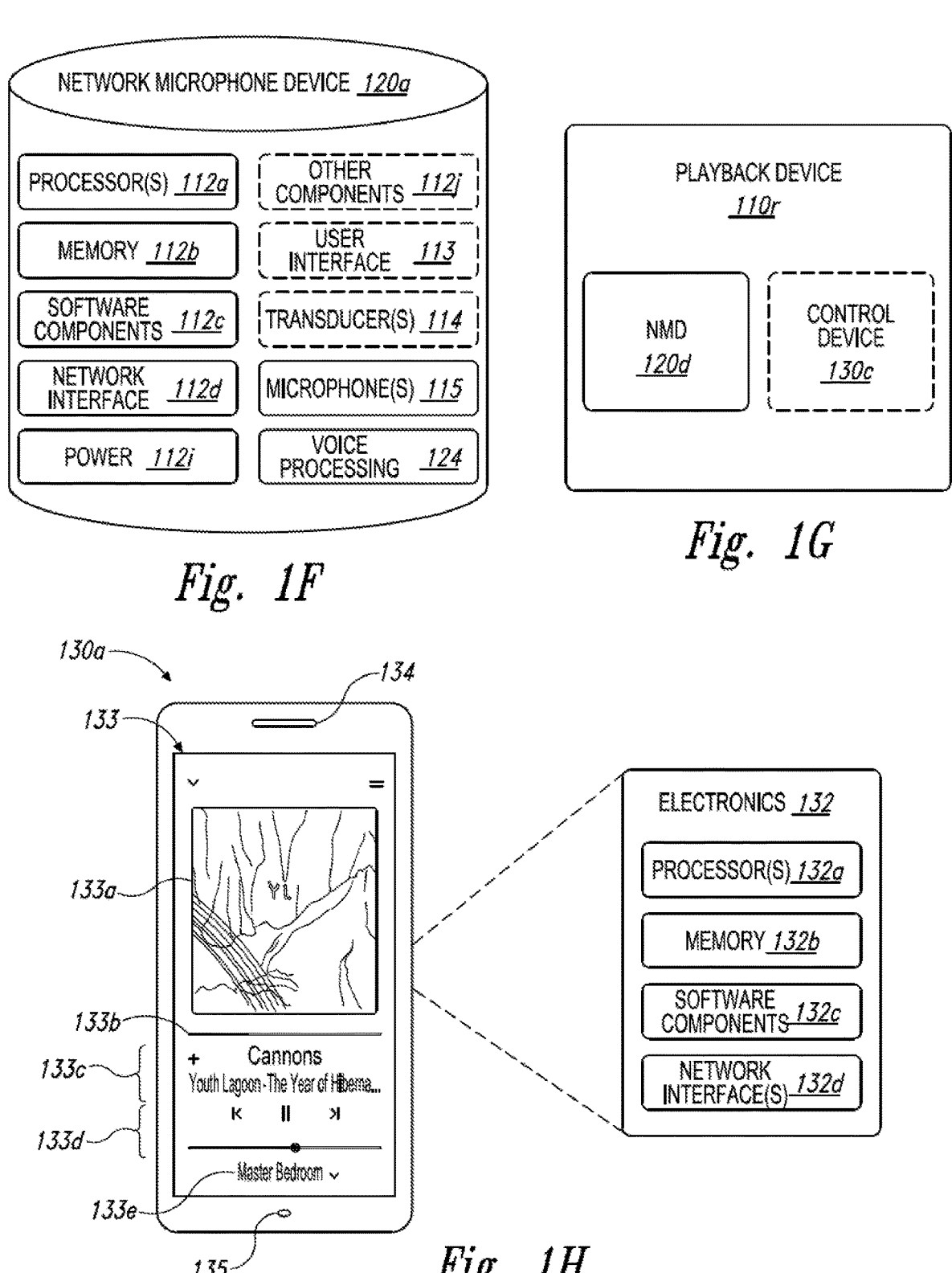
FIG. 1F shows a block diagram of a network microphone device.
FIG. 1G shows a block diagram of a playback device.
FIG. 1H shows a partially schematic diagram of a control device.

FIG. 1F is a block diagram of the NMD 120$a$ (FIGS. 1A and 1B). The NMD 120$a$ includes one or more voice processing components 124 (hereinafter "the voice components 124") and several components described with respect to the playback device 110$a$ (FIG. 1C) including the processors 112$a$, the memory 112$b$, and the microphones 115. The NMD 120$a$ optionally comprises other components also included in the playback device 110$a$ (FIG. 1C), such as the user interface 113 and/or the transducers 114. In some embodiments, the NMD 120$a$ is configured as a media playback device (e.g., one or more of the playback devices 110), and further includes, for example, one or more of the audio processing components 112$g$ (FIG. 1C), the transducers 114, and/or other playback device components. In certain embodiments, the NMD 120$a$ comprises an Internet of Things (IoT) device such as, for example, a thermostat, alarm panel, fire and/or smoke detector, etc. In some embodiments, the NMD 120$a$ comprises the microphones 115, the voice processing 124, and only a portion of the components of the electronics 112 described above with respect to FIG. 1B. In some aspects, for example, the NMD 120a includes the processor 112a and the memory 112b (FIG. 1B), while omitting one or more other components of the electronics 112. In some embodiments, the NMD 120a includes additional components (e.g., one or more sensors, cameras, thermometers, barometers, hygrometers).

In some embodiments, an NMD can be integrated into a playback device. FIG. 1G is a block diagram of a playback device 110r comprising an NMD 120d. The playback device 110r can comprise many or all of the components of the playback device 110a and further include the microphones 115 and voice processing 124 (FIG. 1F). The playback device 110r optionally includes an integrated control device 130c. The control device 130c can comprise, for example, a user interface (e.g., the user interface 113 of FIG. 1B) configured to receive user input (e.g., touch input, voice input) without a separate control device. In other embodiments, however, the playback device 110r receives commands from another control device (e.g., the control device 130a of FIG. 1B). Additional NMD embodiments are described in further detail below with respect to FIGS. 3A-3F.

Referring again to FIG. 1F, the microphones 115 are configured to acquire, capture, and/or receive sound from an environment (e.g., the environment 101 of FIG. 1A) and/or a room in which the NMD 120a is positioned. The received sound can include, for example, vocal utterances, audio played back by the NMD 120a and/or another playback device, background voices, ambient sounds, etc. The microphones 115 convert the received sound into electrical signals to produce microphone data. The voice processing 124 receives and analyzes the microphone data to determine whether a voice input is present in the microphone data. The voice input can comprise, for example, an activation word followed by an utterance including a user request. As those of ordinary skill in the art will appreciate, an activation word is a word or other audio cue that signifying a user voice input. For instance, in querying the AMAZON® VAS, a user might speak the activation word "Alexa." Other examples include "Ok, Google" for invoking the GOOGLE® VAS and "Hey, Siri" for invoking the APPLE® VAS.

After detecting the activation word, voice processing 124 monitors the microphone data for an accompanying user request in the voice input. The user request may include, for example, a command to control a third-party device, such as a thermostat (e.g., NEST® thermostat), an illumination device (e.g., a PHILIPS HUE® lighting device), or a media playback device (e.g., a Sonos® playback device). For example, a user might speak the activation word "Alexa" followed by the utterance "set the thermostat to 68 degrees" to set a temperature in a home (e.g., the environment 101 of FIG. 1A). The user might speak the same activation word followed by the utterance "turn on the living room" to turn on illumination devices in a living room area of the home. The user may similarly speak an activation word followed by a request to play a particular song, an album, or a playlist of music on a playback device in the home. Additional description regarding receiving and processing voice input data can be found in further detail below with respect to FIGS. 3A-3F.

d. Suitable Control Devices

FIG. 1H is a partially schematic diagram of the control device 130a (FIGS. 1A and 1B). As used herein, the term "control device" can be used interchangeably with "controller" or "control system." Among other features, the control device 130a is configured to receive user input related to the media playback system 100 and, in response, cause one or more devices in the media playback system 100 to perform an action(s) or operation(s) corresponding to the user input. In the illustrated embodiment, the control device 130a comprises a smartphone (e.g., an iPhone™, an Android phone) on which media playback system controller application software is installed. In some embodiments, the control device 130a comprises, for example, a tablet (e.g., an iPad'), a computer (e.g., a laptop computer, a desktop computer), and/or another suitable device (e.g., a television, an automobile audio head unit, an IoT device). In certain embodiments, the control device 130a comprises a dedicated controller for the media playback system 100. In other embodiments, as described above with respect to FIG. 1G, the control device 130a is integrated into another device in the media playback system 100 (e.g., one more of the playback devices 110, NMDs 120, and/or other suitable devices configured to communicate over a network).

The control device 130a includes electronics 132, a user interface 133, one or more speakers 134, and one or more microphones 135. The electronics 132 comprise one or more processors 132a (referred to hereinafter as "the processors 132a"), a memory 132b, software components 132c, and a network interface 132d. The processor 132a can be configured to perform functions relevant to facilitating user access, control, and configuration of the media playback system 100. The memory 132b can comprise data storage that can be loaded with one or more of the software components executable by the processor 302 to perform those functions. The software components 132c can comprise applications and/or other executable software configured to facilitate control of the media playback system 100. The memory 112b can be configured to store, for example, the software components 132c, media playback system controller application software, and/or other data associated with the media playback system 100 and the user.

The network interface 132d is configured to facilitate network communications between the control device 130a and one or more other devices in the media playback system 100, and/or one or more remote devices. In some embodiments, the network interface 132d is configured to operate according to one or more suitable communication industry standards (e.g., infrared, radio, wired standards including IEEE 802.3, wireless standards including IEEE 802.11a, 802.11b, 802.11g, 802.11n, 802.11ac, 802.15, 4G, LTE). The network interface 132d can be configured, for example, to transmit data to and/or receive data from the playback devices 110, the NMDs 120, other ones of the control devices 130, one of the computing devices 106 of FIG. 1B, devices comprising one or more other media playback systems, etc. The transmitted and/or received data can include, for example, playback device control commands, state variables, playback zone and/or zone group configurations. For instance, based on user input received at the user interface 133, the network interface 132d can transmit a playback device control command (e.g., volume control, audio playback control, audio content selection) from the control device 304 to one or more of playback devices. The network interface 132d can also transmit and/or receive configuration changes such as, for example, adding/removing one or more playback devices to/from a zone, adding/removing one or more zones to/from a zone group, forming a bonded or consolidated player, separating one or more playback devices from a bonded or consolidated player, among others. Additional description of zones and groups can be found below with respect to FIGS. 1-I through 1M.

The user interface 133 is configured to receive user input and can facilitate 'control of the media playback system 100. The user interface 133 includes media content art 133a (e.g., album art, lyrics, videos), a playback status indicator 133b (e.g., an elapsed and/or remaining time indicator), media content information region 133c, a playback control region 133d, and a zone indicator 133e. The media content information region 133c can include a display of relevant information (e.g., title, artist, album, genre, release year) about media content currently playing and/or media content in a queue or playlist. The playback control region 133d can include selectable (e.g., via touch input and/or via a cursor or another suitable selector) icons to cause one or more playback devices in a selected playback zone or zone group to perform playback actions such as, for example, play or pause, fast forward, rewind, skip to next, skip to previous, enter/exit shuffle mode, enter/exit repeat mode, enter/exit cross fade mode, etc. The playback control region 133d may also include selectable icons to modify equalization settings, playback volume, and/or other suitable playback actions. In the illustrated embodiment, the user interface 133 comprises a display presented on a touch screen interface of a smartphone (e.g., an iPhone™, an Android phone). In some embodiments, however, user interfaces of varying formats, styles, and interactive sequences may alternatively be implemented on one or more network devices to provide comparable control access to a media playback system.

The one or more speakers 134 (e.g., one or more transducers) can be configured to output sound to the user of the control device 130a. In some embodiments, the one or more speakers comprise individual transducers configured to correspondingly output low frequencies, mid-range frequencies, and/or high frequencies. In some aspects, for example, the control device 130a is configured as a playback device (e.g., one of the playback devices 110). Similarly, in some embodiments the control device 130a is configured as an NMD (e.g., one of the NMDs 120), receiving voice commands and other sounds via the one or more microphones 135.

The one or more microphones 135 can comprise, for example, one or more condenser microphones, electret condenser microphones, dynamic microphones, and/or other suitable types of microphones or transducers. In some embodiments, two or more of the microphones 135 are arranged to capture location information of an audio source (e.g., voice, audible sound) and/or configured to facilitate filtering of background noise. Moreover, in certain embodiments, the control device 130a is configured to operate as playback device and an NMD. In other embodiments, however, the control device 130a omits the one or more speakers 134 and/or the one or more microphones 135. For instance, the control device 130a may comprise a device (e.g., a thermostat, an IoT device, a network device) comprising a portion of the electronics 132 and the user interface 133 (e.g., a touch screen) without any speakers or microphones. Additional control device embodiments are described in further detail below with respect to FIGS. 4A-4D and 5.

e. Suitable Playback Device Configurations

Figure 1M:
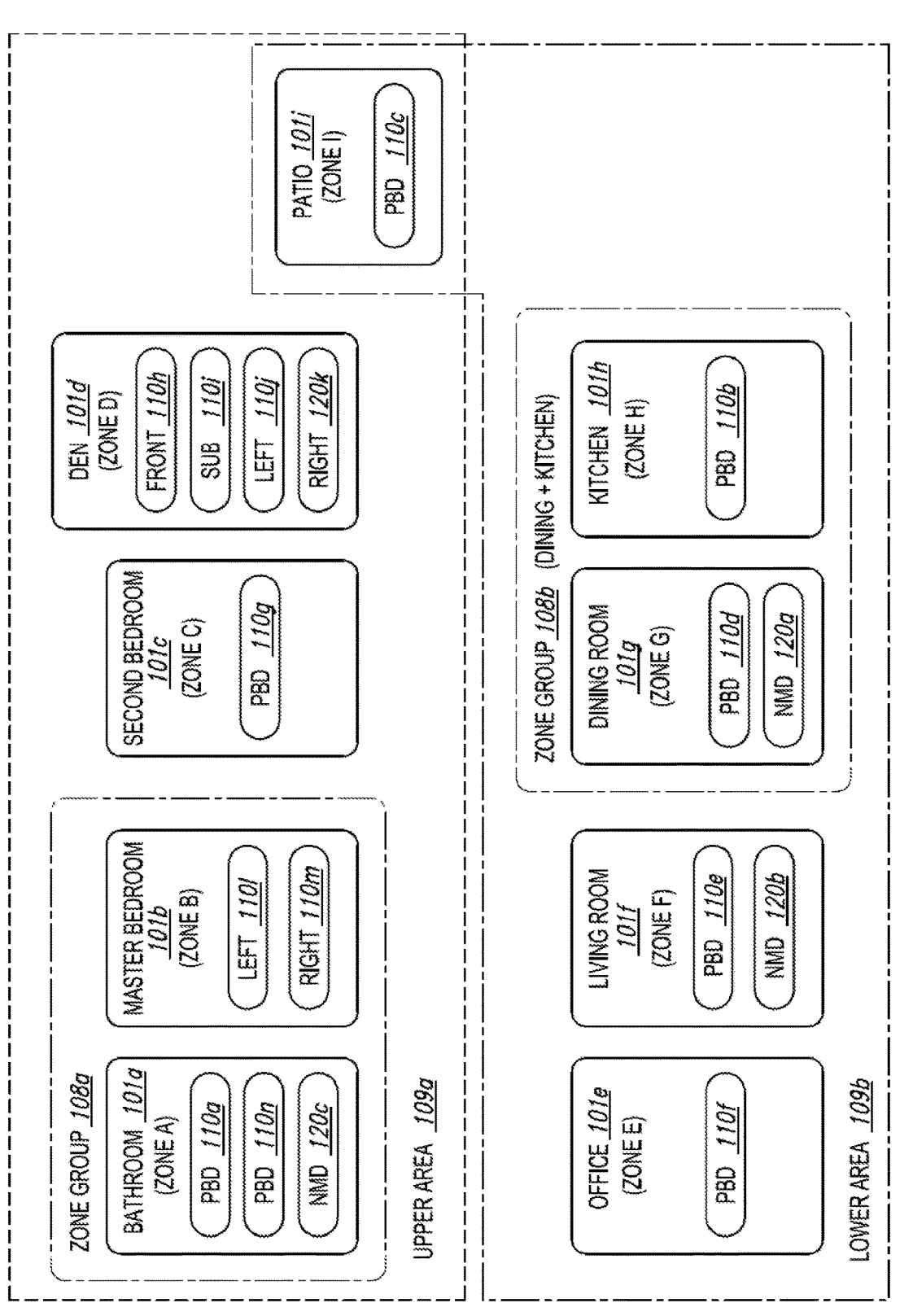
FIG. 1M shows a schematic diagram of media playback system areas.

FIGS. 1-1 through 1M show example configurations of playback devices in zones and zone groups. Referring first to FIG. 1M, in one example, a single playback device may belong to a zone. For example, the playback device 110g in the second bedroom 101c (FIG. 1A) may belong to Zone C. In some implementations described below, multiple playback devices may be "bonded" to form a "bonded pair" which together form a single zone. For example, the playback device 110l (e.g., a left playback device) can be bonded to the playback device 110l (e.g., a left playback device) to form Zone A. Bonded playback devices may have different playback responsibilities (e.g., channel responsibilities). In another implementation described below, multiple playback devices may be merged to form a single zone. For example, the playback device 110h (e.g., a front playback device) may be merged with the playback device 110i (e.g., a subwoofer), and the playback devices 110j and 110k (e.g., left and right surround speakers, respectively) to form a single Zone D. In another example, the playback devices 110g and 110h can be be merged to form a merged group or a zone group 108b. The merged playback devices 110g and 110h may not be specifically assigned different playback responsibilities. That is, the merged playback devices 110h and 110i may, aside from playing audio data in synchrony, each play audio data as they would if they were not merged.

Each zone in the media playback system 100 may be provided for control as a single user interface (UI) entity. For example, Zone A may be provided as a single entity named Master Bathroom. Zone B may be provided as a single entity named Master Bedroom. Zone C may be provided as a single entity named Second Bedroom.

Playback devices that are bonded may have different playback responsibilities, such as responsibilities for certain audio channels. For example, as shown in FIG. 1-I, the playback devices 110l and 110m may be bonded so as to produce or enhance a stereo effect of audio data. In this example, the playback device 110l may be configured to play a left channel audio component, while the playback device 110k may be configured to play a right channel audio component. In some implementations, such stereo bonding may be referred to as "pairing."

Additionally, bonded playback devices may have additional and/or different respective speaker drivers. As shown in FIG. 1J, the playback device 110h named Front may be bonded with the playback device 110i named SUB. The Front device 110h can be configured to render a range of mid to high frequencies and the SUB device 110i can be configured render low frequencies. When unbonded, however, the Front device 110h can be configured render a full range of frequencies. As another example, FIG. 1K shows the Front and SUB devices 110h and 110i further bonded with Left and Right playback devices 110j and 110k, respectively. In some implementations, the Right and Left devices 110j and 102k can be configured to form surround or "satellite" channels of a home theater system. The bonded playback devices 110h, 110i, 110j, and 110k may form a single Zone D (FIG. 1M).

Playback devices that are merged may not have assigned playback responsibilities, and may each render the full range of audio data the respective playback device is capable of. Nevertheless, merged devices may be represented as a single UI entity (i.e., a zone, as discussed above). For instance, the playback devices 110a and 110n the master bathroom have the single UI entity of Zone A. In one embodiment, the playback devices 110a and 110n may each output the full range of audio data each respective playback devices 110a and 110n are capable of, in synchrony.

In some embodiments, an NMD is bonded or merged with another device so as to form a zone. For example, the NMD 120b may be bonded with the playback device 110e, which together form Zone F, named Living Room. In other embodiments, a stand-alone network microphone device may be in a zone by itself. In other embodiments, however, a stand-alone network microphone device may not be associated with a zone. Additional details regarding associating network microphone devices and playback devices as designated or default devices may be found, for example, in previously referenced U.S. patent application Ser. No. 15/438,749.

Zones of individual, bonded, and/or merged devices may be grouped to form a zone group. For example, referring to FIG. 1M, Zone A may be grouped with Zone B to form a zone group 108a that includes the two zones. Similarly, Zone G may be grouped with Zone H to form the zone group 108b. As another example, Zone A may be grouped with one or more other Zones C-I. The Zones A-I may be grouped and ungrouped in numerous ways. For example, three, four, five, or more (e.g., all) of the Zones A-I may be grouped. When grouped, the zones of individual and/or bonded playback devices may play back audio in synchrony with one another, as described in previously referenced U.S. Pat. No. 8,234, 395. Playback devices may be dynamically grouped and ungrouped to form new or different groups that synchronously play back audio data.

In various implementations, the zones in an environment may be the default name of a zone within the group or a combination of the names of the zones within a zone group. For example, Zone Group 108b can have an assigned a name such as "Dining+Kitchen", as shown in FIG. 1M. In some embodiments, a zone group may be given a unique name selected by a user.

Certain data may be stored in a memory of a playback device (e.g., the memory 112b of FIG. 1C) as one or more state variables that are periodically updated and used to describe the state of a playback zone, the playback device(s), and/or a zone group associated therewith. The memory may also include the data associated with the state of the other devices of the media system, and shared from time to time among the devices so that one or more of the devices have the most recent data associated with the system.

In some embodiments, the memory may store instances of various variable types associated with the states. Variables instances may be stored with identifiers (e.g., tags) corresponding to type. For example, certain identifiers may be a first type "a1" to identify playback device(s) of a zone, a second type "b1" to identify playback device(s) that may be bonded in the zone, and a third type "c1" to identify a zone group to which the zone may belong. As a related example, identifiers associated with the second bedroom 101c may indicate that the playback device is the only playback device of the Zone C and not in a zone group. Identifiers associated with the Den may indicate that the Den is not grouped with other zones but includes bonded playback devices 110h-110k. Identifiers associated with the Dining Room may indicate that the Dining Room is part of the Dining+Kitchen zone group 108b and that devices 110b and 110d are grouped (FIG. 1L). Identifiers associated with the Kitchen may indicate the same or similar information by virtue of the Kitchen being part of the Dining+Kitchen zone group 108b. Other example zone variables and identifiers are described below.

In yet another example, the media playback system 100 may variables or identifiers representing other associations of zones and zone groups, such as identifiers associated with Areas, as shown in FIG. 1M. An area may involve a cluster of zone groups and/or zones not within a zone group. For instance, FIG. 1M shows an Upper Area 109a including Zones A-D, and a Lower Area 109b including Zones E-I. In one aspect, an Area may be used to invoke a cluster of zone groups and/or zones that share one or more zones and/or zone groups of another cluster. In another aspect, this differs from a zone group, which does not share a zone with another zone group. Further examples of techniques for implementing Areas may be found, for example, in U.S. application Ser. No. 15/682,506 filed Aug. 21, 2017 and titled "Room Association Based on Name," and U.S. Pat. No. 8,483,853 filed Sep. 11, 2007, and titled "Controlling and manipulating groupings in a multi-zone media system." Each of these applications is incorporated herein by reference in its entirety. In some embodiments, the media playback system 100 may not implement Areas, in which case the system may not store variables associated with Areas.

III. Example Systems and Devices

Figure 2A:
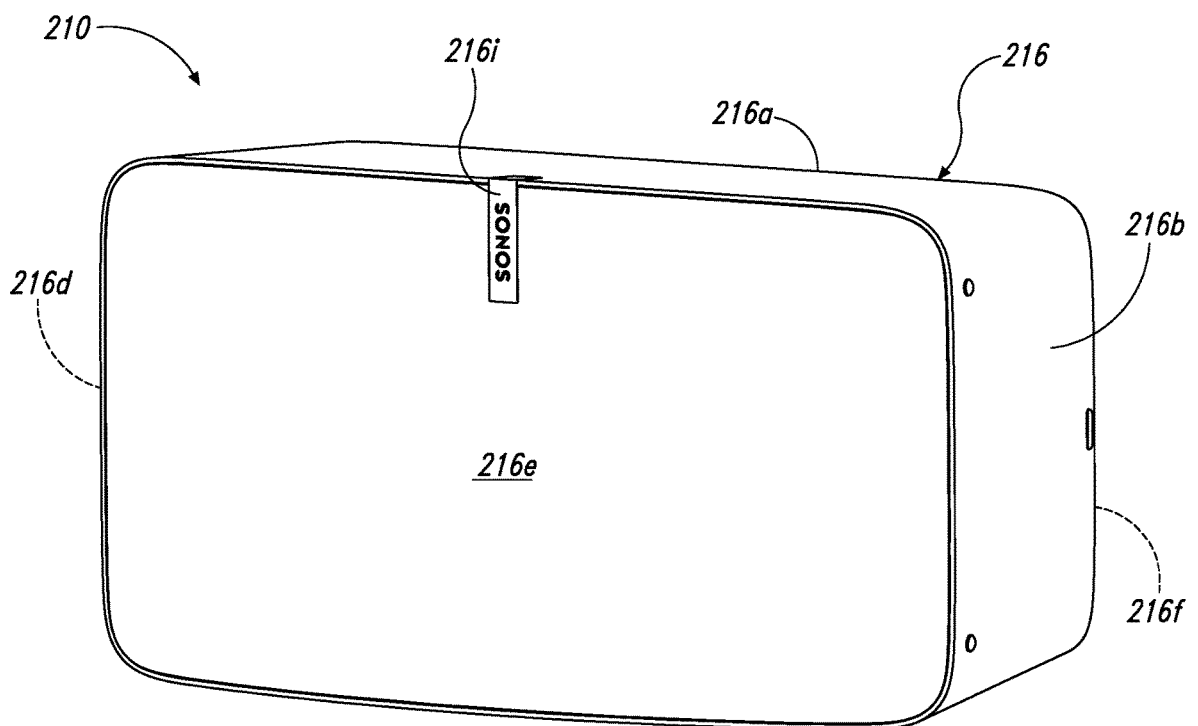
FIG. 2A shows a front isometric view of a playback device configured in accordance with aspects of the disclosed technology.
Figure 2B:
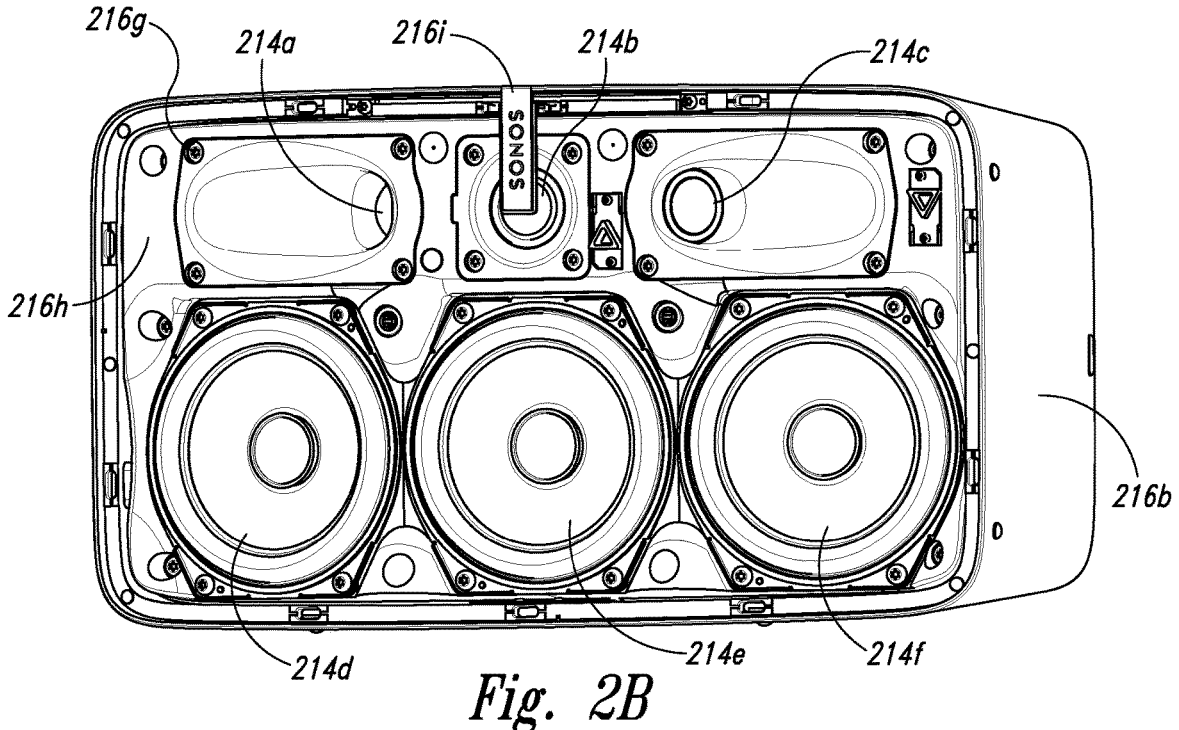
FIG. 2B shows a front isometric view of the playback device of FIG. 3A without a grille.
Figure 2C:
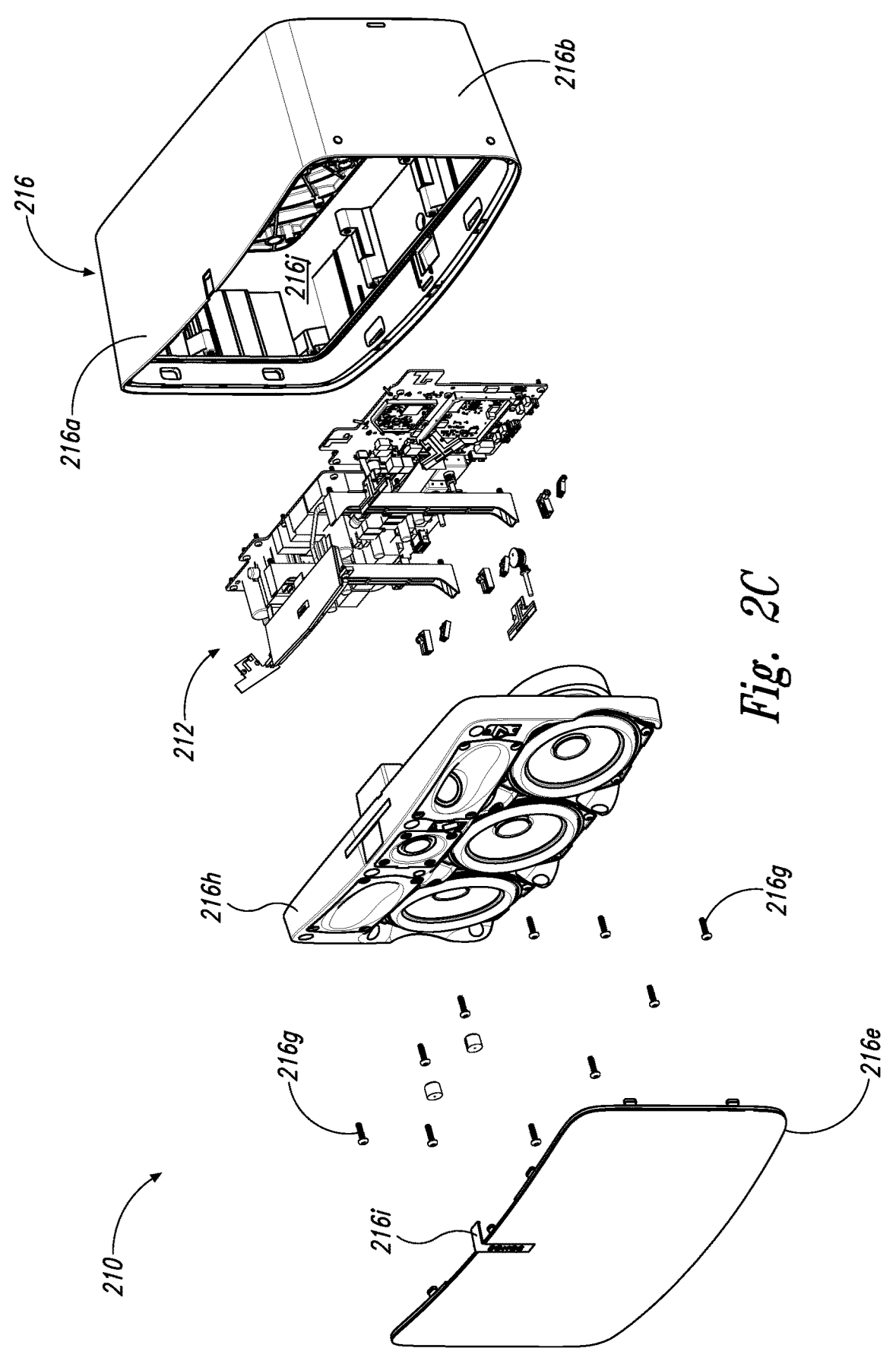
FIG. 2C shows an exploded view of the playback device of FIG. 2A.

FIG. 2A is a front isometric view of a playback device 210 configured in accordance with aspects of the disclosed technology. FIG. 2B is a front isometric view of the playback device 210 without a grille 216e. FIG. 2C is an exploded view of the playback device 210. Referring to FIGS. 2A-2C together, the playback device 210 comprises a housing 216 that includes an upper portion 216a, a right or first side portion 216b, a lower portion 216c, a left or second side portion 216d, the grille 216e, and a rear portion 216f. A plurality of fasteners 216g (e.g., one or more screws, rivets, clips) attaches a frame 216h to the housing 216. A cavity 216j (FIG. 2C) in the housing 216 is configured to receive the frame 216h and electronics 212. The frame 216h is configured to carry a plurality of transducers 214 (identified individually in FIG. 2B as transducers 214a-f). The electronics 212 (e.g., the electronics 112 of FIG. 1C) is configured to receive audio data from an audio source and send electrical signals corresponding to the audio data to the transducers 214 for playback.

The transducers 214 are configured to receive the electrical signals from the electronics 112, and further configured to convert the received electrical signals into audible sound during playback. For instance, the transducers 214a-c (e.g., tweeters) can be configured to output high frequency sound (e.g., sound waves having a frequency greater than about 2 kHz). The transducers 214d-f (e.g., mid-woofers, woofers, midrange speakers) can be configured output sound at frequencies lower than the transducers 214a-c (e.g., sound waves having a frequency lower than about 2 kHz). In some embodiments, the playback device 210 includes a number of transducers different than those illustrated in FIGS. 2A-2C. For example, as described in further detail below with respect to FIGS. 3A-3C, the playback device 210 can include fewer than six transducers (e.g., one, two, three). In other embodiments, however, the playback device 210 includes more than six transducers (e.g., nine, ten). Moreover, in some embodiments, all or a portion of the transducers 214 are configured to operate as a phased array to desirably adjust (e.g., narrow or widen) a radiation pattern of the transducers 214, thereby altering a user's perception of the sound emitted from the playback device 210.

In the illustrated embodiment of FIGS. 2A-2C, a filter 216i is axially aligned with the transducer 214b. The filter 216i can be configured to desirably attenuate a predetermined range of frequencies that the transducer 214b outputs to improve sound quality and a perceived sound stage output collectively by the transducers 214. In some embodiments, however, the playback device 210 omits the filter 216i. In other embodiments, the playback device 210 includes one or more additional filters aligned with the transducers 214b and/or at least another of the transducers 214.

Figures 3A, 3B:
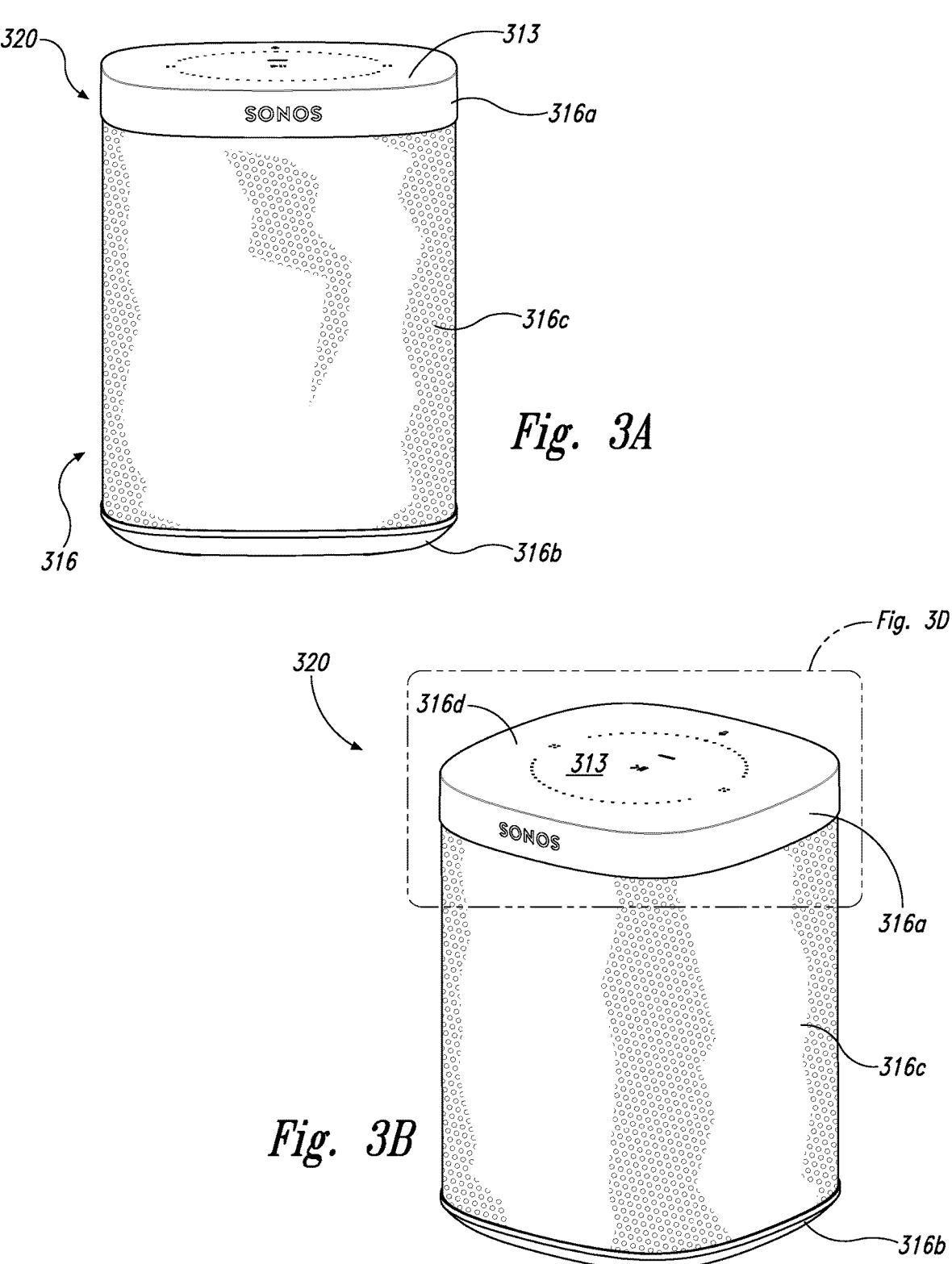
FIG. 3A shows a front view of a network microphone device configured in accordance with aspects of the disclosed technology.
FIG. 3B shows a side isometric view of the network microphone device of FIG. 3A.
Figure 3C:
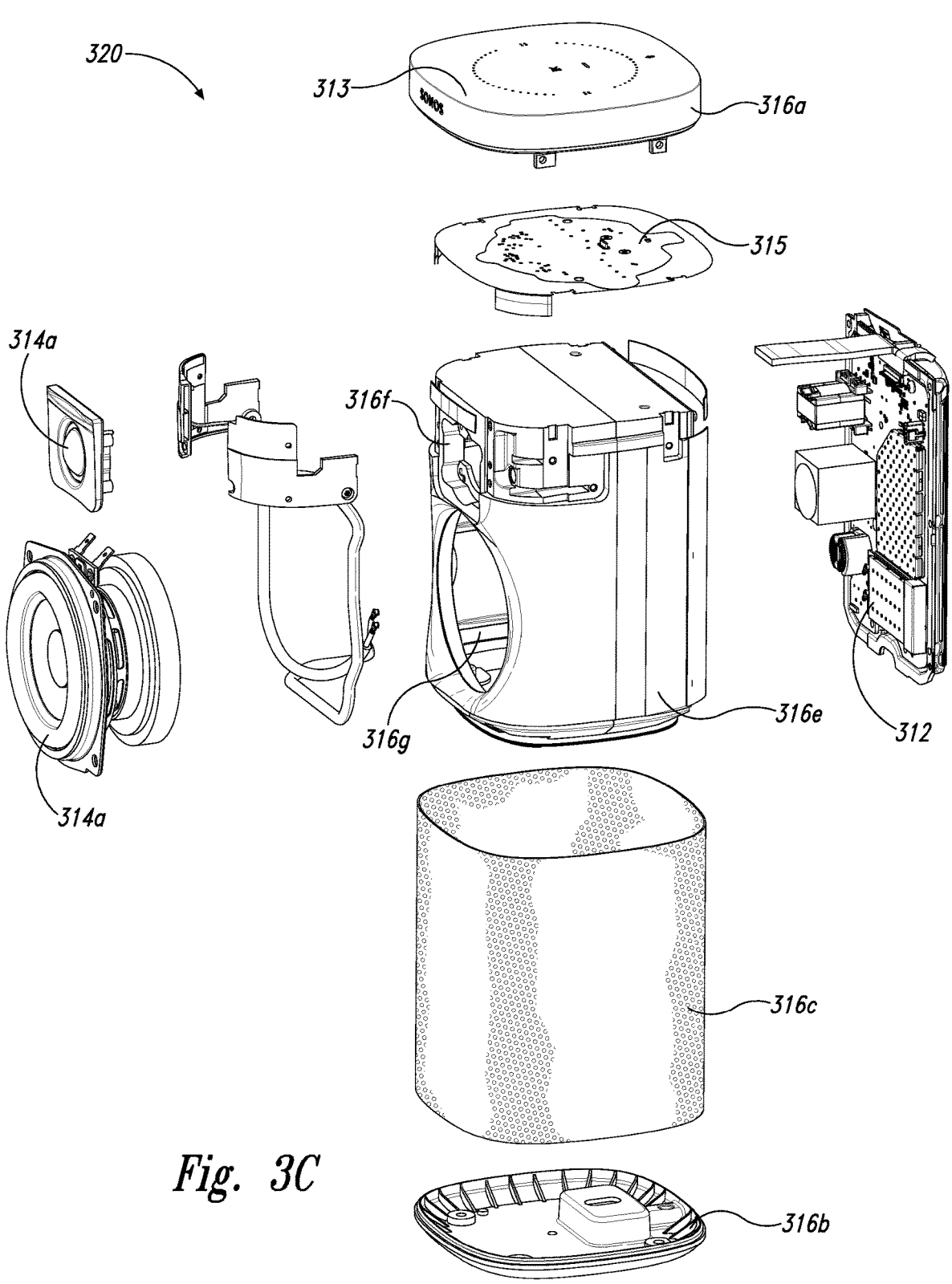
FIG. 3C shows an exploded view of the network microphone device of FIGS. 3A and 3B.
Figure 3D:
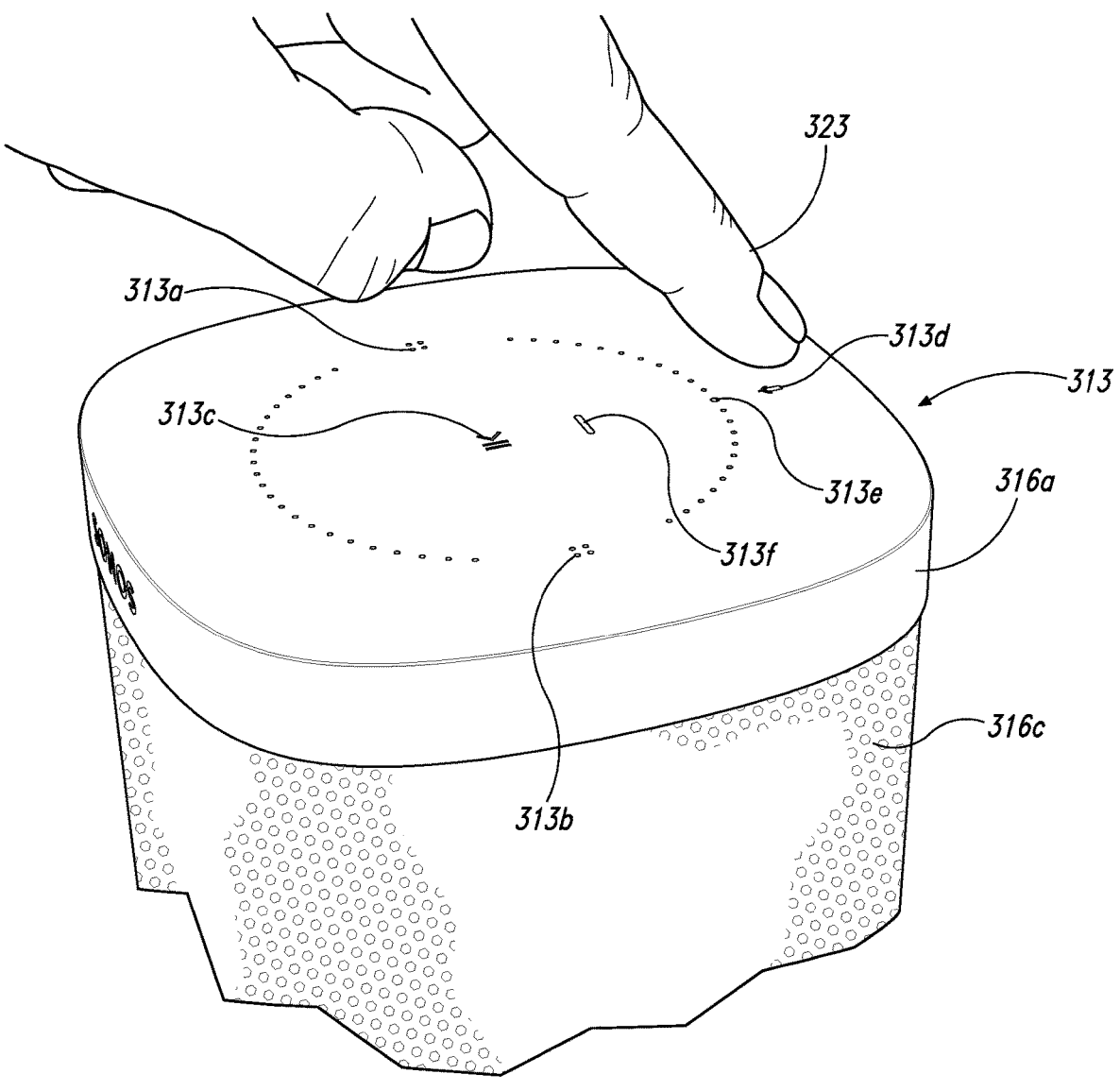
FIG. 3D shows an enlarged view of a portion of FIG. 3B.

FIGS. 3A and 3B are front and right isometric side views, respectively, of an NMD 320 configured in accordance with embodiments of the disclosed technology. FIG. 3C is an exploded view of the NMD 320. FIG. 3D is an enlarged view of a portion of FIG. 3B including a user interface 313 of the NMD 320. Referring first to FIGS. 3A-3C, the NMD 320 includes a housing 316 comprising an upper portion 316a, a lower portion 316b and an intermediate portion 316c (e.g., a grille). A plurality of ports, holes or apertures 316d in the upper portion 316a allow sound to pass through to one or more microphones 315 (FIG. 3C) positioned within the housing 316. The one or more microphones 316 are configured to received sound via the apertures 316d and produce electrical signals based on the received sound. In the illustrated embodiment, a frame 316e (FIG. 3C) of the housing 316 surrounds cavities 316f and 316g configured to house, respectively, a first transducer 314a (e.g., a tweeter) and a second transducer 314b (e.g., a mid-woofer, a midrange speaker, a woofer). In other embodiments, however, the NMD 320 includes a single transducer, or more than two (e.g., two, five, six) transducers. In certain embodiments, the NMD 320 omits the transducers 314a and 314b altogether.

Electronics 312 (FIG. 3C) includes components configured to drive the transducers 314a and 314b, and further configured to analyze audio information corresponding to the electrical signals produced by the one or more microphones 315. In some embodiments, for example, the electronics 312 comprises many or all of the components of the electronics 112 described above with respect to FIG. 1C. In certain embodiments, the electronics 312 includes components described above with respect to FIG. 1F such as, for example, the one or more processors 112a, the memory 112b, the software components 112c, the network interface 112d, etc. In some embodiments, the electronics 312 includes additional suitable components (e.g., proximity or other sensors).

Referring to FIG. 3D, the user interface 313 includes a plurality of control surfaces (e.g., buttons, knobs, capacitive surfaces) including a first control surface 313a (e.g., a previous control), a second control surface 313b (e.g., a next control), and a third control surface 313c (e.g., a play and/or pause control). A fourth control surface 313d is configured to receive touch input corresponding to activation and deactivation of the one or microphones 315. A first indicator 313e (e.g., one or more light emitting diodes (LEDs) or another suitable illuminator) can be configured to illuminate only when the one or more microphones 315 are activated. A second indicator 313f (e.g., one or more LEDs) can be configured to remain solid during normal operation and to blink or otherwise change from solid to indicate a detection of voice activity. In some embodiments, the user interface 313 includes additional or fewer control surfaces and illuminators. In one embodiment, for example, the user interface 313 includes the first indicator 313e, omitting the second indicator 313f. Moreover, in certain embodiments, the NMD 320 comprises a playback device and a control device, and the user interface 313 comprises the user interface of the control device.

Referring to FIGS. 3A-3D together, the NMD 320 is configured to receive voice commands from one or more adjacent users via the one or more microphones 315. As described above with respect to FIG. 1B, the one or more microphones 315 can acquire, capture, or record sound in a vicinity (e.g., a region within 10 m or less of the NMD 320) and transmit electrical signals corresponding to the recorded sound to the electronics 312. The electronics 312 can process the electrical signals and can analyze the resulting audio data to determine a presence of one or more voice commands (e.g., one or more activation words). In some embodiments, for example, after detection of one or more suitable voice commands, the NMD 320 is configured to transmit a portion of the recorded audio data to another device and/or a remote server (e.g., one or more of the computing devices 106 of FIG. 1B) for further analysis. The remote server can analyze the audio data, determine an appropriate action based on the voice command, and transmit a message to the NMD 320 to perform the appropriate action. For instance, a user may speak "Sonos, play Michael Jackson." The NMD 320 can, via the one or more microphones 315, record the user's voice utterance, determine the presence of a voice command, and transmit the audio data having the voice command to a remote server (e.g., one or more of the remote computing devices 106 of FIG. 1B, one or more servers of a VAS and/or another suitable service). The remote server can analyze the audio data and determine an action corresponding to the command. The remote server can then transmit a command to the NMD 320 to perform the determined action (e.g., play back audio content related to Michael Jackson). The NMD 320 can receive the command and play back the audio content related to Michael Jackson from a media content source. As described above with respect to FIG. 1B, suitable content sources can include a device or storage communicatively coupled to the NMD 320 via a LAN (e.g., the network 104 of FIG. 1B), a remote server (e.g., one or more of the remote computing devices 106 of FIG. 1B), etc. In certain embodiments, however, the NMD 320 determines and/or performs one or more actions corresponding to the one or more voice commands without intervention or involvement of an external device, computer, or server.

Figures 3E, 3F:
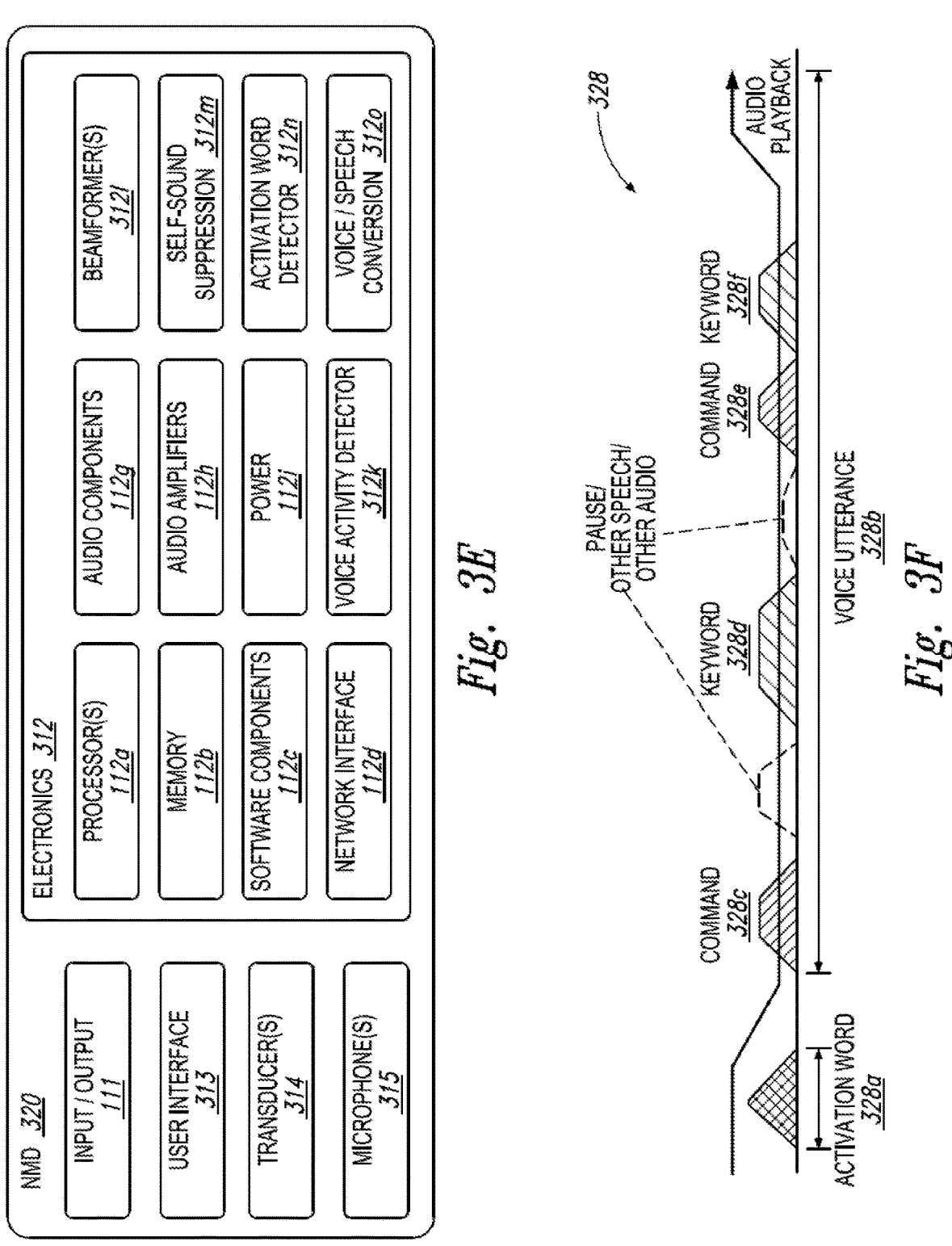
FIG. 3E shows a block diagram of the network microphone device of FIGS. 3A-3D
FIG. 3F shows a schematic diagram of an example voice input.

FIG. 3E is a functional block diagram showing additional features of the NMD 320 in accordance with aspects of the disclosure. The NMD 320 includes components configured to facilitate voice command capture including voice activity detector component(s) 312k, beam former components 312l, acoustic echo cancellation (AEC) and/or self-sound suppression components 312m, activation word detector components 312n, and voice/speech conversion components 312o (e.g., voice-to-text and text-to-voice). In the illustrated embodiment of FIG. 3E, the foregoing components 312k-312o are shown as separate components. In some embodiments, however, one or more of the components 312k-312o are subcomponents of the processors 112a.

The beamforming and self-sound suppression components 312l and 312m are configured to detect an audio signal and determine aspects of voice input represented in the detected audio signal, such as the direction, amplitude, frequency spectrum, etc. The voice activity detector activity components 312k are operably coupled with the beamforming and AEC components 312l and 312m and are configured to determine a direction and/or directions from which voice activity is likely to have occurred in the detected audio signal. Potential speech directions can be identified by monitoring metrics which distinguish speech from other sounds. Such metrics can include, for example, energy within the speech band relative to background noise and entropy within the speech band, which is measure of spectral structure. As those of ordinary skill in the art will appreciate, speech typically has a lower entropy than most common background noise.

The activation word detector components 312n are configured to monitor and analyze received audio to determine if any activation words (e.g., wake words) are present in the received audio. The activation word detector components 312n may analyze the received audio using an activation word detection algorithm. If the activation word detector 312n detects an activation word, the NMD 320 may process voice input contained in the received audio. Example activation word detection algorithms accept audio as input and provide an indication of whether an activation word is present in the audio. Many first- and third-party activation word detection algorithms are known and commercially available. For instance, operators of a voice service may make their algorithm available for use in third-party devices. Alternatively, an algorithm may be trained to detect certain activation words. In some embodiments, the activation word detector 312n runs multiple activation word detection algorithms on the received audio simultaneously (or substantially simultaneously). As noted above, different voice services (e.g. AMAZON's ALEXA®, APPLE's SIRI®, or MICROSOFT's CORTANA®) can each use a different activation word for invoking their respective voice service. To support multiple services, the activation word detector 312n may run the received audio through the activation word detection algorithm for each supported voice service in parallel.

The speech/text conversion components 312o may facilitate processing by converting speech in the voice input to text. In some embodiments, the electronics 312 can include voice recognition software that is trained to a particular user or a particular set of users associated with a household. Such voice recognition software may implement speech-processing algorithms that are tuned to specific voice profile(s). Tuning to specific voice profiles may require less computationally intensive algorithms than traditional voice activity services, which typically sample from a broad base of users and diverse requests that are not targeted to media playback systems.

FIG. 3F is a schematic diagram of an example voice input 328 captured by the NMD 320 in accordance with aspects of the disclosure. The voice input 328 can include a activation word portion 328a and a voice utterance portion 328b. In some embodiments, the activation word 557a can be a known activation word, such as "Alexa," which is associated with AMAZON's ALEXA®. In other embodiments, however, the voice input 328 may not include a activation word. In some embodiments, a network microphone device may output an audible and/or visible response upon detection of the activation word portion 328a. In addition or alternately, an NMB may output an audible and/or visible response after processing a voice input and/or a series of voice inputs.

The voice utterance portion 328b may include, for example, one or more spoken commands (identified individually as a first command 328c and a second command 328e) and one or more spoken keywords (identified individually as a first keyword 328d and a second keyword 3280. In one example, the first command 328c can be a command to play music, such as a specific song, album, playlist, etc. In this example, the keywords may be one or words identifying one or more zones in which the music is to be played, such as the Living Room and the Dining Room shown in FIG. 1A. In some examples, the voice utterance portion 328b can include other information, such as detected pauses (e.g., periods of non-speech) between words spoken by a user, as shown in FIG. 3F. The pauses may demarcate the locations of separate commands, keywords, or other information spoke by the user within the voice utterance portion 328b.

In some embodiments, the media playback system 100 is configured to temporarily reduce the volume of audio data that it is playing while detecting the activation word portion 557a. The media playback system 100 may restore the volume after processing the voice input 328, as shown in FIG. 3F. Such a process can be referred to as ducking, examples of which are disclosed in U.S. patent application Ser. No. 15/438,749, incorporated by reference herein in its entirety.

Figures 4A, 4B, 4C, 4D:
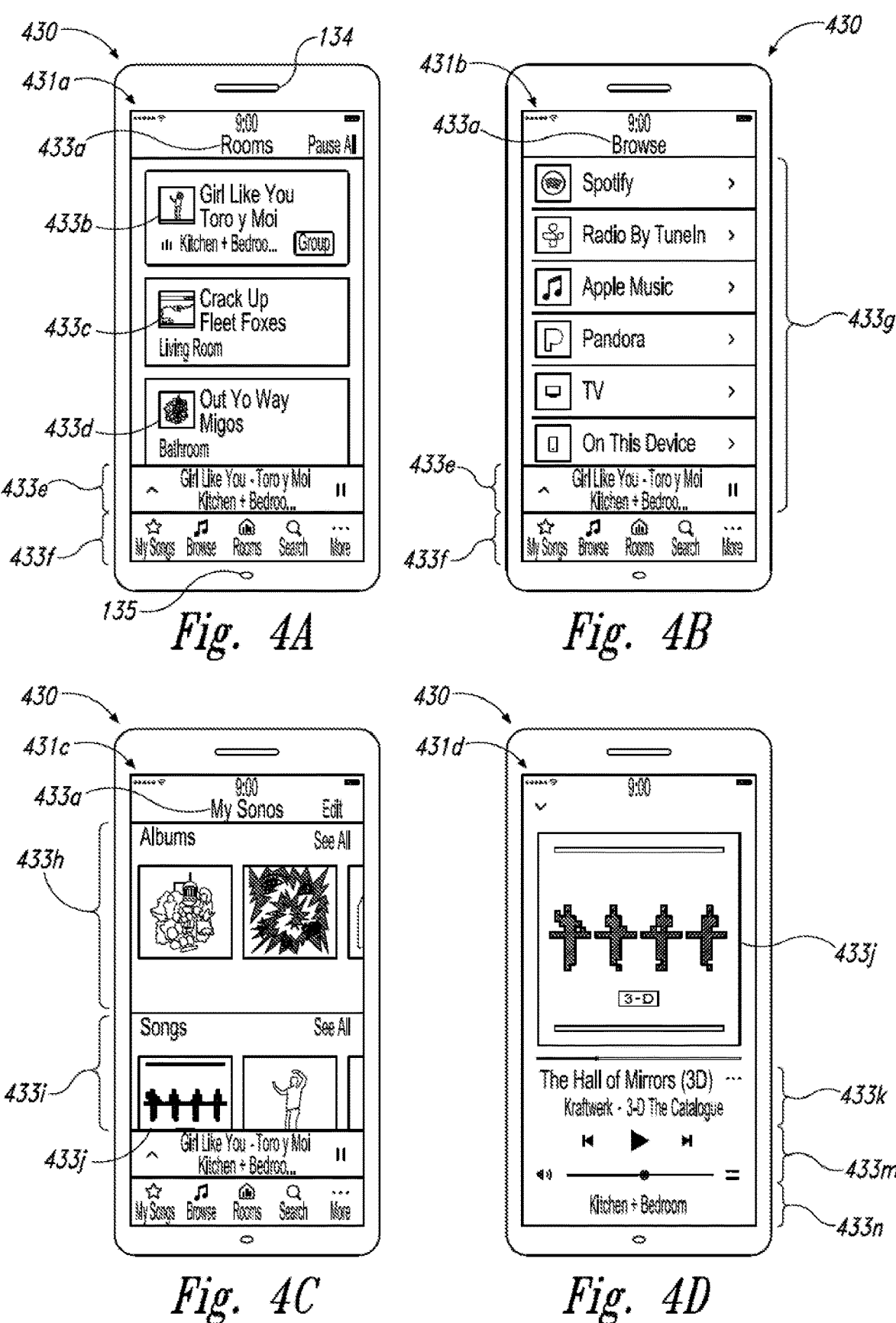
FIGS. 4A-4D show schematic diagrams of a control device in various stages of operation in accordance with aspects of the disclosed technology.

FIGS. 4A-4D are schematic diagrams of a control device 430 (e.g., the control device 130a of FIG. 1H, a smartphone, a tablet, a dedicated control device, an IoT device, and/or another suitable device) showing corresponding user interface displays in various states of operation. A first user interface display 431a (FIG. 4A) includes a display name 433a (i.e., "Rooms"). A selected group region 433b displays audio content information (e.g., artist name, track name, album art) of audio content played back in the selected group and/or zone. Group regions 433c and 433d display corresponding group and/or zone name, and audio content information audio content played back or next in a playback queue of the respective group or zone. An audio content region 433e includes information related to audio content in the selected group and/or zone (i.e., the group and/or zone indicated in the selected group region 433b). A lower display region 433f is configured to receive touch input to display one or more other user interface displays. For example, if a user selects "Browse" in the lower display region 433f, the control device 430 can be configured to output a second user interface display 431b (FIG. 4B) comprising a plurality of music services 433g (e.g., Spotify, Radio by Tunein, Apple Music, Pandora, Amazon, TV, local music, line-in) through which the user can browse and from which the user can select media content for play back via one or more playback devices (e.g., one of the playback devices 110 of FIG. 1A). Alternatively, if the user selects "My Sonos" in the lower display region 433f, the control device 430 can be configured to output a third user interface display 431c (FIG. 4C). A first media content region 433h can include graphical representations (e.g., album art) corresponding to individual albums, stations, or playlists. A second media content region 433i can include graphical representations (e.g., album art) corresponding to individual songs, tracks, or other media content. If the user selections a graphical representation 433j (FIG. 4C), the control device 430 can be configured to begin play back of audio content corresponding to the graphical representation 433j and output a fourth user interface display 431d fourth user interface display 431d includes an enlarged version of the graphical representation 433j, media content information 433k (e.g., track name, artist, album), transport controls 433m (e.g., play, previous, next, pause, volume), and indication 433n of the currently selected group and/or zone name.

Figure 5:
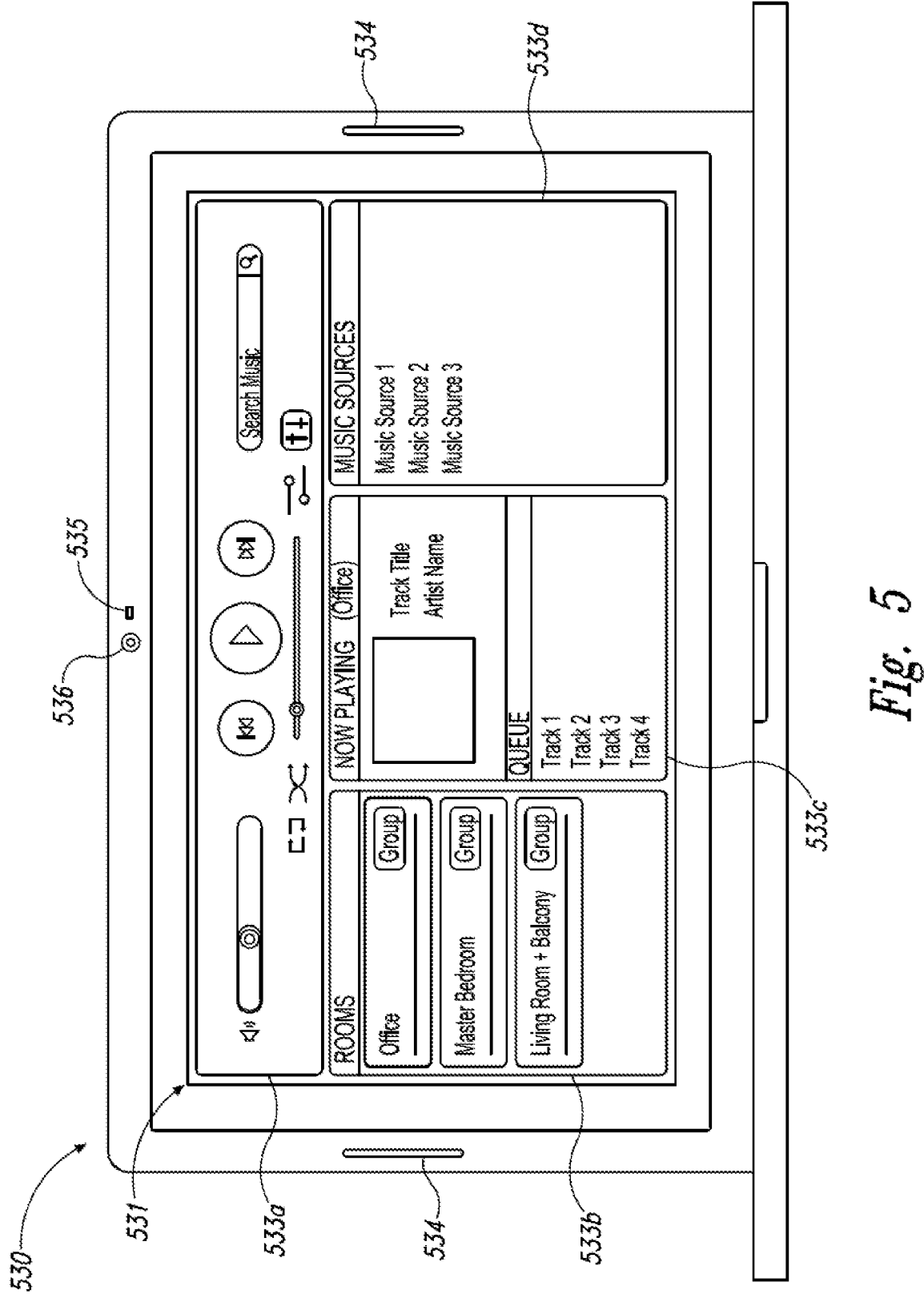
FIG. 5 shows front view of a control device.

FIG. 5 is a schematic diagram of a control device 530 (e.g., a laptop computer, a desktop computer). The control device 530 includes transducers 534, a microphone 535, and a camera 536. A user interface 531 includes a transport control region 533a, a playback status region 533b, a playback zone region 533c, a playback queue region 533d, and a media content source region 533e. The transport control region comprises one or more controls for controlling media playback including, for example, volume, previous, play/pause, next, repeat, shuffle, track position, crossfade, equalization, etc. The audio content source region 533e includes a listing of one or more media content sources from which a user can select media items for play back and/or adding to a playback queue.

The playback zone region 533b can include representations of playback zones within the media playback system 100 (FIGS. 1A and 1B). In some embodiments, the graphical representations of playback zones may be selectable to bring up additional selectable icons to manage or configure the playback zones in the media playback system, such as a creation of bonded zones, creation of zone groups, separation of zone groups, renaming of zone groups, etc. In the illustrated embodiment, a "group" icon is provided within each of the graphical representations of playback zones. The "group" icon provided within a graphical representation of a particular zone may be selectable to bring up options to select one or more other zones in the media playback system to be grouped with the particular zone. Once grouped, playback devices in the zones that have been grouped with the particular zone can be configured to play audio data in synchrony with the playback device(s) in the particular zone. Analogously, a "group" icon may be provided within a graphical representation of a zone group. In the illustrated embodiment, the "group" icon may be selectable to bring up options to deselect one or more zones in the zone group to be removed from the zone group. In some embodiments, the control device 530 includes other interactions and implementations for grouping and ungrouping zones via the user interface 531. In certain embodiments, the representations of playback zones in the playback zone region 533*b* can be dynamically updated as playback zone or zone group configurations are modified.

The playback status region 533*c* includes graphical representations of audio content that is presently being played, previously played, or scheduled to play next in the selected playback zone or zone group. The selected playback zone or zone group may be visually distinguished on the user interface, such as within the playback zone region 533*b* and/or the playback queue region 533*d*. The graphical representations may include track title, artist name, album name, album year, track length, and other relevant information that may be useful for the user to know when controlling the media playback system 100 via the user interface 531.

The playback queue region 533*d* includes graphical representations of audio content in a playback queue associated with the selected playback zone or zone group. In some embodiments, each playback zone or zone group may be associated with a playback queue containing information corresponding to zero or more audio items for playback by the playback zone or zone group. For instance, each audio item in the playback queue may comprise a uniform resource identifier (URI), a uniform resource locator (URL) or some other identifier that may be used by a playback device in the playback zone or zone group to find and/or retrieve the audio item from a local audio content source or a networked audio content source, possibly for playback by the playback device. In some embodiments, for example, a playlist can be added to a playback queue, in which information corresponding to each audio item in the playlist may be added to the playback queue. In some embodiments, audio items in a playback queue may be saved as a playlist. In certain embodiments, a playback queue may be empty, or populated but "not in use" when the playback zone or zone group is playing continuously streaming audio content, such as Internet radio that may continue to play until otherwise stopped, rather than discrete audio items that have playback durations. In some embodiments, a playback queue can include Internet radio and/or other streaming audio content items and be "in use" when the playback zone or zone group is playing those items.

When playback zones or zone groups are "grouped" or "ungrouped," playback queues associated with the affected playback zones or zone groups may be cleared or re-associated. For example, if a first playback zone including a first playback queue is grouped with a second playback zone including a second playback queue, the established zone group may have an associated playback queue that is initially empty, that contains audio items from the first playback queue (such as if the second playback zone was added to the first playback zone), that contains audio items from the second playback queue (such as if the first playback zone was added to the second playback zone), or a combination of audio items from both the first and second playback queues. Subsequently, if the established zone group is ungrouped, the resulting first playback zone may be re-associated with the previous first playback queue, or be associated with a new playback queue that is empty or contains audio items from the playback queue associated with the established zone group before the established zone group was ungrouped. Similarly, the resulting second playback zone may be re-associated with the previous second playback queue, or be associated with a new playback queue that is empty, or contains audio items from the playback queue associated with the established zone group before the established zone group was ungrouped.

Figure 6:
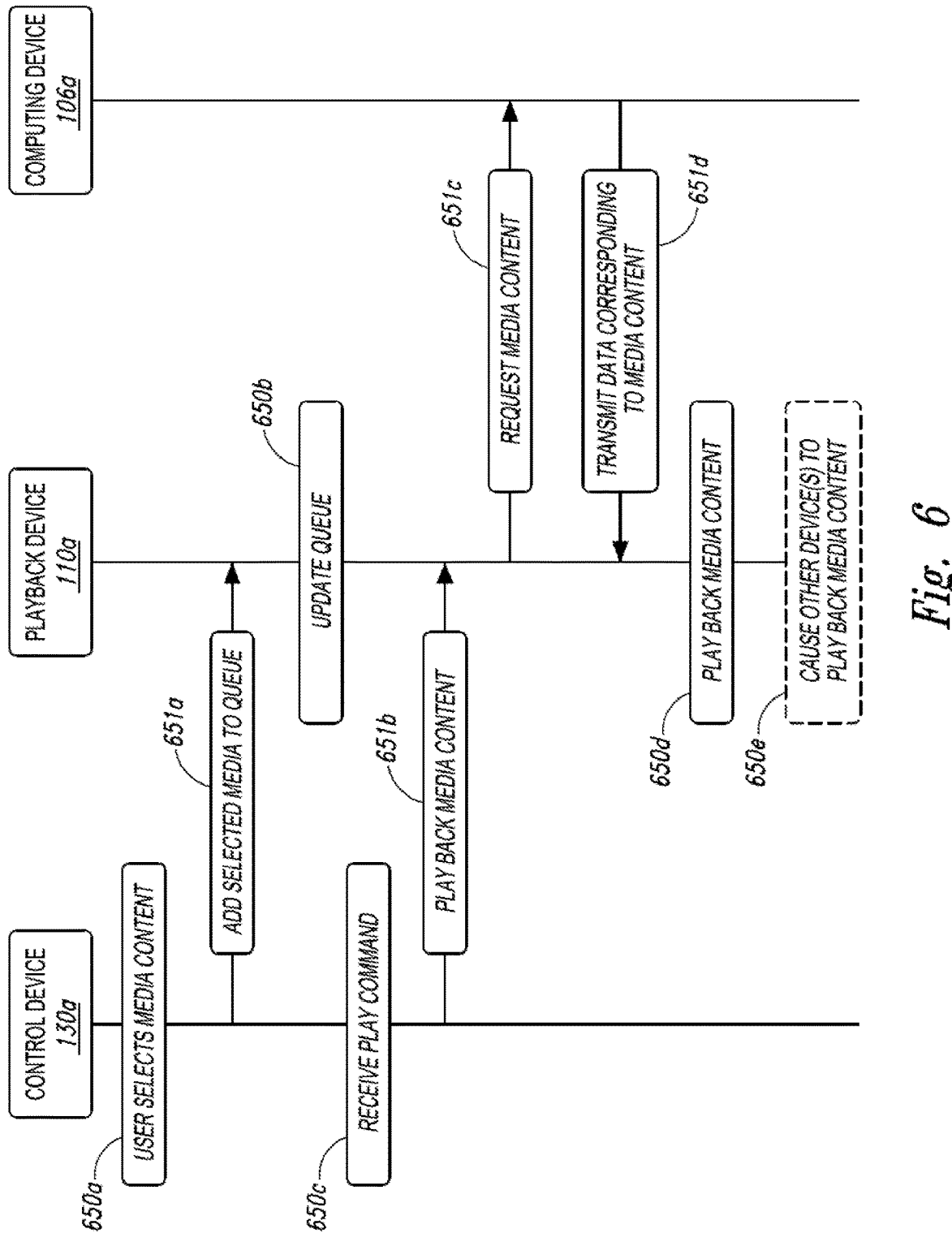
FIG. 6 shows a message flow diagram of a media playback system.

FIG. 6 is a message flow diagram illustrating data exchanges between devices of the media playback system 100 (FIGS. 1A-1M).

At step 650*a*, the media playback system 100 receives an indication of selected media content (e.g., one or more songs, albums, playlists, podcasts, videos, stations) via the control device 130*a*. The selected media content can comprise, for example, media items stored locally on or more devices (e.g., the audio source 105 of FIG. 1C) connected to the media playback system and/or media items stored on one or more media service servers (one or more of the remote computing devices 106 of FIG. 1B). In response to receiving the indication of the selected media content, the control device 130*a* transmits a message 651*a* to the playback device 110*a* (FIGS. 1A-1C) to add the selected media content to a playback queue on the playback device 110*a*.

At step 650*b*, the playback device 110*a* receives the message 651*a* and adds the selected media content to the playback queue for play back.

At step 650*c*, the control device 130*a* receives input corresponding to a command to play back the selected media content. In response to receiving the input corresponding to the command to play back the selected media content, the control device 130*a* transmits a message 651*b* to the playback device 110*a* causing the playback device 110*a* to play back the selected media content. In response to receiving the message 651*b*, the playback device 110*a* transmits a message 651*c* to the first computing device 106*a* requesting the selected media content. The first computing device 106*a*, in response to receiving the message 651*c*, transmits a message 651*d* comprising data (e.g., audio data, video data, a URL, a URI) corresponding to the requested media content.

At step 650*d*, the playback device 110*a* receives the message 651*d* with the data corresponding to the requested media content and plays back the associated media content.

At step 650*e*, the playback device 110*a* optionally causes one or more other devices to play back the selected media content. In one example, the playback device 110*a* is one of a bonded zone of two or more players (FIG. 1M). The playback device 110*a* can receive the selected media content and transmit all or a portion of the media content to other devices in the bonded zone. In another example, the playback device 110*a* is a coordinator of a group and is configured to transmit and receive timing information from one or more other devices in the group. The other one or more devices in the group can receive the selected media content from the first computing device 106*a*, and begin playback of the selected media content in response to a message from the playback device 110a such that all of the devices in the group play back the selected media content in synchrony.

IV. Examples of Playback Devices with Auxiliary Audiovisual Inputs

As noted previously, one challenge in the context of home theatre audio is ensuring that the appropriate audio format is delivered to the associated playback device(s) (e.g., a soundbar and/or one or more surrounds). Many televisions do not properly transmit home theater audio from the audiovisual content source (e.g., streaming media box, Blu Ray player) either because of lack of requisite hardware or non-compliant implementation of particular standards. Examples of the present technology address these and other problems by providing an audio playback device (e.g., a soundbar or other suitable device) that includes an auxiliary HDMI port (or other suitable input connection, whether wired or wireless) configured to receive audiovisual content from a media source. As such, the audiovisual content can be received directly at the playback device, which can play back the associated audio content without relying on the display device to provide the audio data via a return channel (e.g., eARC). However, this approach requires that the audio playback device only play back such audio content when the video display device is playing back video corresponding to the audiovisual content received from the audio playback device. For example, if the audio playback device receives audiovisual content from a connected gaming console, but the video display device has selected a cable input as the media source, then the audio playback device should play back audio received from the cable input, and not audio received from the gaming console.

Because an audio playback device may have no direct indication of which media source is selected at the video display device, it can be beneficial for the audio playback device to tag the audio data received from the audiovisual content source before sending the audio data and video data to the video display device. This tagging can include manipulating, modifying, appending, or otherwise altering the first audio data to generate tagged audio data that is computationally distinguishable from the original audio data. For example, a digital watermark or other indicia can be added to the audio data to produce tagged audio data. Such a tag or digital watermark can be detected by the audio playback device to distinguish the tagged audio data from the first audio data. In various examples, tagging the first audio data can include downmixing (or upmixing) the audio data to have a different number of channels, adding predetermined inaudible artifacts to the first audio data (e.g., ultrasonic signals or other inaudible artifacts), or any other suitable modification of the first audio data. In some examples, the tag can be configured to be detectable even after the video display device further processes or manipulates the audio data. For example, in some instances a video display device may downmix (or upmix) the received, tagged audio data before returning the audio data to the audio playback device. The tag can be configured such that it is detectable even after the downmixing (or upmixing).

Next, the audio playback device can transmit both the tagged audio data and the video data to the video display device. This transmission can occur over a wired connection (e.g., HDMI) or a wireless connection. In operation, the audio playback device may also receive a second audio stream from the display device (e.g., via an eARC connection). This second audio stream can be evaluated to determine whether it corresponds to the audio received from the audiovisual content source. For example, the audio playback device can evaluate the received audio to identify the tag that was introduced by the playback device previously. If this tag is identified, then the selected media source for the video display device matches the audiovisual content source coupled to the audio playback device. In this scenario, the playback device may play back the audio received directly from the audiovisual content source rather than relying on the potentially downgraded audio received from the video display device. If the tag is not identified, then the audio playback device may play back audio received from the video display device, as this indicates that the media source selected for the video display device does not correspond to the audiovisual content source coupled to the audio playback device. The tag can be evaluated continuously, periodically, or intermittently so that the playback device can select the appropriate audio for playback to correspond to the video being synchronously played back via the display device.

Additionally or alternatively, when a tag is identified in the second audio data, the second audio data can also be evaluated to determine whether any signal degradation has occurred. For example, the audio playback device may receive a multichannel audio signal (e.g., DTS, Dolby, etc.) and add a tag before sending this audio signal to the video display device. When the playback device receives the return audio from the video display device, however, the return audio may have the tag but also have been downmixed into a stereo signal. This indicates that there is a match between the selected sources, but also indicates that the video display device is degrading the quality of the audio being provided to the video display device from the audio playback device. In some examples, this can trigger an error message or other user output that indicates an improper setting of the video display device. The error message can be displayed via the video display device, a controller device, the audio playback device, or any other suitable device. The output or error message can take any suitable form, whether visual, audible, or otherwise. In some examples, the error message may also suggest one or more steps to remedy the problem.

These approaches may beneficially remove reliance on the display device to provide the highest quality audio available (e.g., Dolby Atmos) for media received via third-party media sources. In some examples the audio playback device can be configured to reduce latency by playing back audio received directly from the audiovisual content source rather than utilizing the return audio received via eARC or other connection. Additionally or alternatively, the audio playback device can be configured to introduce delay buffers to the video content before transmitting the video content to the video display device for playback. These delay buffers can be selected to offset a delay associated with transmitting the audio to other devices within the environment (e.g., Bluetooth headphones or other playback devices), such that the video playback occurs in substantial lip synchrony with the audio playback.

Figure 7:
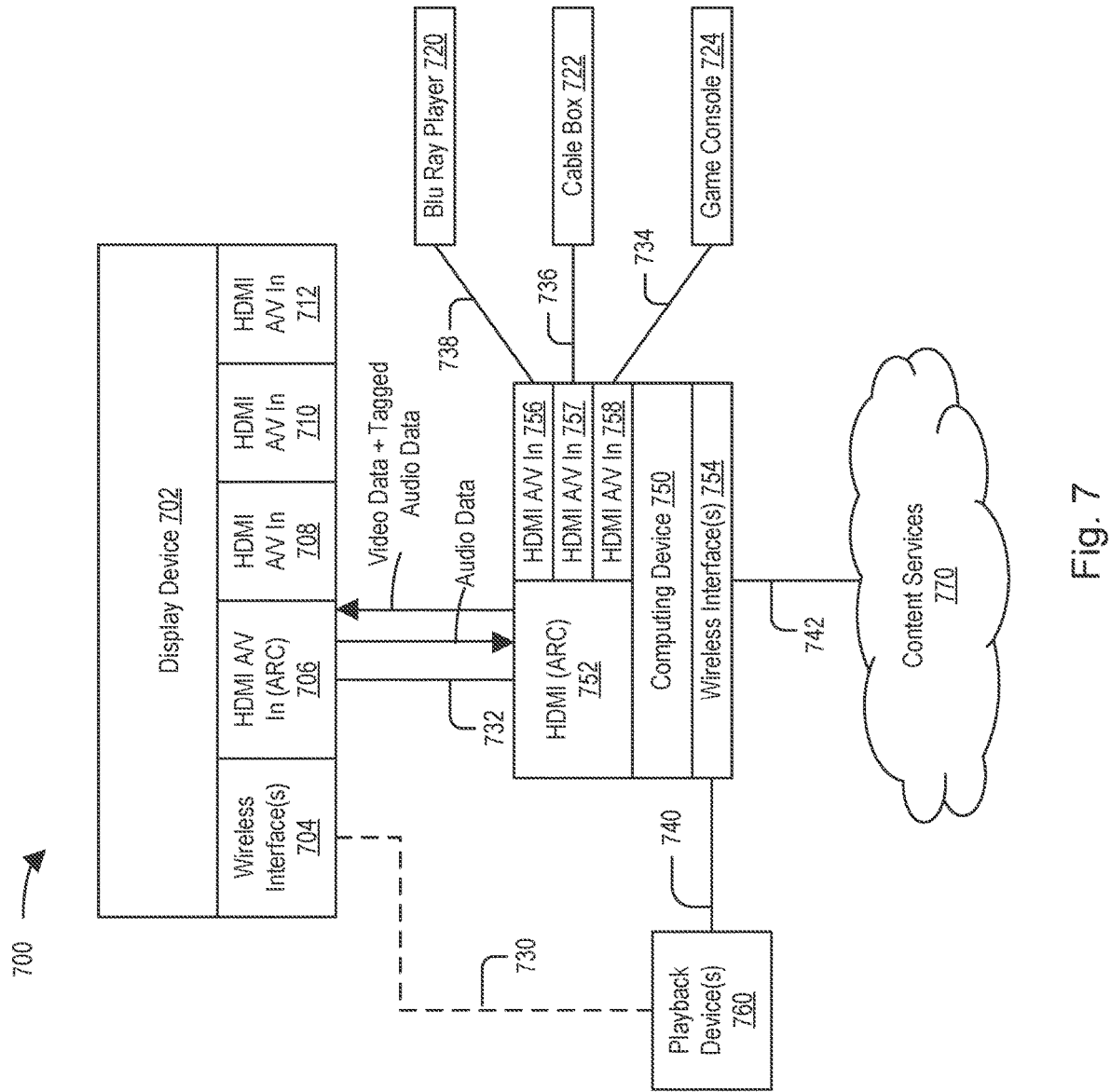
FIG. 7 shows an example system configured for playback of audiovisual content according to some embodiments.

FIG. 7 shows an example system 700 configured for playback of audiovisual content according to some embodiments. System 700 includes a display device 702, a Blu Ray player 720, a cable box 722, a game console 724, a computing device 750, one or more playback devices 760, and one or more content services 770. The communication links shown between the devices in system 700 may be wired or wireless communications links.

In the illustrated example, the computing device 750 comprises HDMI (ARC) interface 752, wireless interface(s) 754, and HDMI interfaces 756-758. In some embodiments, the computing device 750 is a playback device that includes one or more speakers, such as a home theater soundbar or other playback device. In some embodiments, computing device 750 is the same as or similar to any of the playback devices disclosed and described herein. The computing device 750 can include one or more processors and tangible, non-transitory computer-readable media with instructions stored in the computer-readable media, where the instructions, when executed by the one or more processors, cause the computing device 750 to perform one or more of the features and/or functions disclosed and described herein.

In various examples, the computing device 750 can include and/or be integrated with an audio playback device (e.g., the computing g device 750 can take the form of a soundbar or other audio playback device). In some instances, the computing device 750 may not include or be integrated with an audio playback device, but may instead be communicatively coupled to one or more audio playback device(s) 760.

In some embodiments, computing device 750 is configured to perform one or more (or all) functions of a group coordinator for a group of playback devices, such as playback device(s) 760, e.g., by performing any one or more (or all) of the group coordinator functions disclosed and described herein. The playback device(s) 760 may be the same as or similar to any of the playback devices disclosed and described herein, including but not limited to a home theater soundbar or other playback device.

The display device 702 may be a television or any other type of device configured to display video data, e.g., a monitor, projector, or similar display device. Display device 702 includes one or more wireless interfaces 704 (e.g., WiFi and/or Bluetooth interfaces), HDMI audiovisual input 706 with Audio Return Channel (ARC), and HDMI interfaces 708-712. HDMI interfaces 708-712 may include HDMI-ARC in some embodiments. In operation, the HDMI links may be physical (e.g., hardware) HDMI links or wireless HDMI links. In some embodiments, the interfaces 706, 708, 710, 712, and 752 (and corresponding links 732, 734, 736, and 738) may operate according to a wired or wireless protocol other than HDMI that is sufficient for transmitting audio/video content, such as FireWire, USB-C, Thunderbolt, WiFi, Ethernet, Bluetooth, or any other suitable protocol now known or later developed.

The Blu Ray player 720, cable box 722, game console 724, and content services 770 are all sources of audiovisual content that comprises audio data and video data. In addition to the Blu Ray player 720, cable box 722, game console 724, and content services 770, the display device 702 may additionally or alternatively be configured to receive audiovisual content from any other audiovisual content source now known or later developed.

As illustrated, the Blu Ray player 720, cable box 722, and game console 724 in system 701 can connect directly to computing device 750. In particular, Blu Ray player 720 is connected to HDMI audiovisual input 756 via link 738, cable box 722 is connected to HDMI audiovisual input 757 via link 736, and game console 724 is connected to HDMI audiovisual input 758 via link 734. The communication links shown between the devices in system 701 may be wired or wireless communications links. In other examples, some or all of these components can be coupled directly to the display device 702 (e.g., via HDMI interfaces 708-712).

In operation, the computing device 750 may receive audiovisual content from one or more of the Blu Ray player 720, the cable box 722, game console 724, or from content services 770. This audiovisual content can be processed by the computing device 750 before being transmitted to the display device 702. For example, the audio data can be tagged at the computing device 750 before being transmitted, alongside the video data, to the display device 702 (e.g., via link 732). Tagging the audio data can include, for example, manipulating, modifying, appending, or otherwise altering the audio data to generate tagged audio data that is computationally distinguishable from the received audio data. Such a tag can later be detected by the computing device 750 to distinguish the tagged audio data from the received audio data. In various examples, tagging the first audio data can include downmixing (or upmixing) the audio data to have a different number of channels, adding predetermined inaudible artifacts to the first audio data (e.g., ultrasonic signals or other inaudible artifacts), or any other suitable modification of the first audio data. In some implementations, a tag can be added repeatedly and/or periodically to an audio data stream such that any given set of audio frames will include at least one instance of a tag.

After sending the video data and the tagged audio data from the computing device 750 to the display device 702, the display device 702 provides return audio data to the computing device 750 (e.g., via link 732). This return audio data may or may not correspond to the tagged audio data that was transmitted to the video display device, depending on the selected media source at the display device 702. For example, if the display device 702 has the computing device 750 (e.g., HDMI interface 706) selected, then the return audio data can include or correspond to the tagged audio data provided by the computing device 750. However, if the display device 702 has a different source selected (e.g., a content source coupled to HDMI interface 708), then the return audio data provided over link 732 from the display device 702 to the computing device 750 will not match the tagged audio data provided by the computing device 750.

As such, by evaluating the audio data received from the display device 702 at the computing device 750, the computing device 750 can determine whether or not the display device 702 has a selected source that corresponds to the computing device 750. If the sources are found to match (i.e., the tag is identified in the return audio data, or a bit-for-bit comparison indicates a content match), then the computing device 750 can play back the audio data received directly from the content source (e.g., Blu-Ray player 720, cable box 722, game console 724, or content services 770). By playing back this audio directly, rather than relying on the return audio provided by the television, any degradation or delay of the audio signal caused by processing at the display device can be avoided. For example, in some instances a display device may improperly downsample multichannel audio format such that the return audio data has fewer channels than the received multichannel audio data. In such instances, it can be beneficial to identify a tag (to confirm that the downsampled audio data does correspond to the tagged audio data provided by the computing device 750) and to play back the audio content received directly from the audiovisual content sources rather than the downsampled audio received from the display device 702.

If, in contrast, the return data does not include the tag, this indicates that the display device 702 has a selected source that does not correspond to the computing device 750, and accordingly the computing device 750 can play back audio received from the display device 702 via link 732. In this scenario, it is appropriate for the return audio to be played back via the computing device 750 (e.g., either directly via computing device 750 or via an associated playback device 760), because the tagged audio data does not correspond to the video content being played back via the display device 702.

By continuously monitoring the received audio for a tag, the computing device 750 can determine when the display device 702 has switched sources either to or away from the computing device 750. Based on this determination, the computing device 750 can dynamically and responsively switch between playing back audio content received directly from an audiovisual source and playing back return audio content received from the display device 702. As a result, the user experience involves only having appropriate audio played back that corresponds to the video content being played back via the display device 702.

FIG. 8 is a flow diagram of an example method 800 for playing back audiovisual content via an audio playback device and an associated video display device. The method 800 can be implemented by any of the devices described herein, or any other devices now known or later developed.

Various examples of the method 800 include one or more operations, functions, or actions illustrated by blocks. Although the blocks are illustrated in sequential order, these blocks may also be performed in parallel, and/or in a different order than the order disclosed and described herein. Also, the various blocks may be combined into fewer blocks, divided into additional blocks, and/or removed based upon a desired implementation.

In addition, for the method 800 and for other processes and methods disclosed herein, the flowcharts show functionality and operation of possible implementations of some examples. In this regard, each block may represent a module, a segment, or a portion of program code, which includes one or more instructions executable by one or more processors for implementing specific logical functions or steps in the process. The program code may be stored on any type of computer readable medium, for example, such as a storage device including a disk or hard drive. The computer readable medium may include non-transitory computer readable media, for example, such as tangible, non-transitory computer-readable media that stores data for short periods of time like register memory, processor cache, and Random-Access Memory (RAM). The computer readable medium may also include non-transitory media, such as secondary or persistent long-term storage, like read only memory (ROM), optical or magnetic disks, compact disc read only memory (CD-ROM), for example. The computer readable media may also be any other volatile or non-volatile storage systems. The computer readable medium may be considered a computer readable storage medium, for example, or a tangible storage device. In addition, for the methods and for other processes and methods disclosed herein, each block in FIG. 8 may represent circuitry that is wired to perform the specific logical functions in the process.

With reference to FIG. 8, the method 800 begins at block 802, which involves receiving, at a playback device, an input stream of audiovisual content. The input stream includes first audio data and associated video data. The input stream may be received from any suitable audiovisual content source, such as a streaming media content service, a Blu Ray player, gaming console, etc. The playback device can be coupled to such audiovisual sources via wired connections (e.g., an HDMI input port), wireless connections, or both wired and wireless connections. In various examples, the first audio data can include multichannel audio suitable for playback via a home theatre arrangement. Examples include 5.1, 7.1, 9.1, Dolby Atmos, or any other suitable multichannel audio format.

The method 800 continues in block 804 with tagging the first audio data to generate tagged audio data. As noted elsewhere herein, tagging the first audio data can involve manipulating, modifying, appending, or otherwise altering the first audio data to generate tagged audio data that is computationally distinguishable from the first audio data. For example, a digital watermark or other indicia can be added to the first audio data to produce the tagged audio data. Such a digital watermark can be detected by the playback device to distinguish the tagged audio data from the first audio data, while still maintaining the ability of the playback device to play back audio based on the tagged audio data that corresponds to first audio data. In other words, tagging the first audio data may not affect audible playback of the audio content. In various examples, tagging the first audio data can include downmixing (or upmixing) the audio data to have a different number of channels, adding predetermined inaudible artifacts to the first audio data (e.g., ultrasonic signals or other inaudible artifacts), or any other suitable modification of the first audio data.

In block 806, the method 800 involves transmitting the tagged audio data along with the video data to a video display device (e.g., a television, projector, or other suitable video display device). This transmission can occur over a wired connection (e.g., an HDMI connection or other suitable hardwired connection) or over a wireless link.

In block 808, the playback device receives, from the video display device, a second audio data stream, and in block 810, the second audio data is evaluated to identify a tag. In some instances, the second audio data stream can include or correspond to the tagged audio data, indicating that the selected television source matches the source providing the audiovisual content to the playback device. For example, if the playback device is receiving audiovisual content from a gaming console, and the selected source for the display device is the gaming console, then the second audio data stream may include the tag.

In other instances, the second audio data stream can be different from the tagged audio data (e.g., may not include the tag or other indicia), indicating that the selected television source does not match the source providing the audiovisual content to the playback device. For example, if the playback device is receiving audiovisual content from a gaming console, but the selected television source is a cable input, then the second audio data received at the playback device will not include a tag.

The method 800 continues in decision block 812 with determining whether the tag is identified. If so, the method 800 continues to block 814 with (i) playing back the first audio data in substantial synchrony with the video data being played back via the display device, and (ii) suppressing playback of the second audio data. As noted above, if the playback device detects a tag in the second audio data, this indicates that the selected source for the display device matches the audiovisual content source coupled to the playback device. Accordingly, rather than relying on the second audio data being provided from the display device, the playback device can instead play back the first audio data that was received directly from the audiovisual content source, thereby sidestepping the risk of improper processing of the first audio data by the display device or other such degradation of the audio data.

In some examples, the audio playback device can be a first playback device, and the method can involve transmitting, from the first audio playback device to a second audio playback device, at least a portion of the first audio data. The second playback device may then play back the received portion of the first audio data, optionally in synchrony with the first audio playback device. For instance, the first playback device might take the form of a soundbar or other stationary playback device and the second playback device might take the form of headphones or other wearable playback device. In such an example, the soundbar can receive first audio data from the display device (e.g., a television) and transmit some or all of the first audio data to the headphones for playback in synchrony with the video data playback. Optionally, the soundbar itself may also play back audio content in synchrony with the wearable playback device, or the soundbar may suppress playback of first audio data by while the wearable playback device is permitted to play back audio. In this manner, a user wearing headphones (or other wearable or non-wearable playback device) may select that device for audio playback in synchrony with video data playback via the display device.

If, in block 812, the tag is not identified, the method 800 continues in block 816 with playing back the second audio data. As noted above, when the tag is not identified in the second audio data, this indicates that the audiovisual content source for the playback device does not correspond to the selected input source for the display device (e.g., the playback device receives the audiovisual content from a gaming console, but the display device has a selected input corresponding to a cable input). In such instances, the playback device may play back the second audio content received from the display device, and may discard or suppress the first audio data that is received from the audiovisual content source.

V. Conclusion

The above discussions relating to playback devices, controller devices, playback zone configurations, and media/audio content sources provide only some examples of operating environments within which functions and methods described below may be implemented. Other operating environments and configurations of media playback systems, playback devices, and network devices not explicitly described herein may also be applicable and suitable for implementation of the functions and methods.

The description above discloses, among other things, various example systems, methods, apparatus, and articles of manufacture including, among other components, firmware and/or software executed on hardware. It is understood that such examples are merely illustrative and should not be considered as limiting. For example, it is contemplated that any or all of the firmware, hardware, and/or software aspects or components can be embodied exclusively in hardware, exclusively in software, exclusively in firmware, or in any combination of hardware, software, and/or firmware. Accordingly, the examples provided are not the only ways) to implement such systems, methods, apparatus, and/or articles of manufacture.

Additionally, references herein to "embodiment" means that a particular feature, structure, or characteristic described in connection with the embodiment can be included in at least one example embodiment of an invention. The appearances of this phrase in various places in the specification are not necessarily all referring to the same embodiment, nor are separate or alternative embodiments mutually exclusive of other embodiments. As such, the embodiments described herein, explicitly and implicitly understood by one skilled in the art, can be combined with other embodiments.

The specification is presented largely in terms of illustrative environments, systems, procedures, steps, logic blocks, processing, and other symbolic representations that directly or indirectly resemble the operations of data processing devices coupled to networks. These process descriptions and representations are typically used by those skilled in the art to most effectively convey the substance of their work to others skilled in the art. Numerous specific details are set forth to provide a thorough understanding of the present disclosure. However, it is understood to those skilled in the art that certain embodiments of the present disclosure can be practiced without certain, specific details. In other instances, well known methods, procedures, components, and circuitry have not been described in detail to avoid unnecessarily obscuring aspects of the embodiments. Accordingly, the scope of the present disclosure is defined by the appended claims rather than the foregoing description of embodiments.

When any of the appended claims are read to cover a purely software and/or firmware implementation, at least one of the elements in at least one example is hereby expressly defined to include a tangible, non-transitory medium such as a memory, DVD, CD, Blu Ray, and so on, storing the software and/or firmware.

Examples of the disclosed technology are described below as numbered examples for convenience. These are provided as examples and do not limit the disclosed technology. It is noted that any of the dependent examples may be combined in any combination, and placed into a respective independent example. The other examples can be presented in a similar manner.

Example 1. A method comprising: receiving, via a first hardware interface of an audio playback device communicatively coupled to a video display device, an input stream of audiovisual content comprising first audio data and video data; tagging the first audio data to generate tagged audio data; transmitting, via a second hardware interface of the audio playback device to the video display device, the tagged audio data and the video data; receiving, via the second hardware interface from the video display device, a second audio data stream; evaluating the second audio data to identify a tag; and after identifying the tag: playing back, via the audio playback device, the first audio data in substantial synchrony with the video data; and suppressing playback of the second audio data.

Example 2. The method of any one of the preceding Examples, wherein tagging the first audio data comprises downmixing the first audio data such that the tagged audio data has fewer channels than the first audio data.

Example 3. The method of any one of the preceding Examples, wherein tagging the first audio data comprises adding predetermined inaudible artifacts to the first audio data.

Example 4. The method of any one of the preceding Examples, wherein evaluating the second audio data to identify a tag comprises comparing the tagged audio data and the second audio data.

Example 5. The method of any one of the preceding Examples, wherein the audio playback device receives the input stream via an HDMI connection, and wherein the audio playback device transmits the tagged audio data and the video data to the video display device via an eARC connection.

Example 6. The method of any one of the preceding Examples, wherein the audio playback device receives the input stream from one or more of: one or more remote computing devices associated with a media content service, a Blu Ray player, or a DVD player.

Example 7. The method of any one of the preceding Examples, wherein the first audio data has a first number of audio channels, and wherein the second audio data has a second number of channels fewer than the first, the method further comprising: generating an error indication that the video display device may have incorrect audio settings.

Example 8. The method of any one of the preceding Examples, further comprising: after suppressing playback of the second audio data, continuing to evaluate the second audio stream to identify the tag; after failing to identify the tag within a predetermined period of time (e.g., 10 ms, 50 ms, 100 ms, 500 ms): suppressing playback of the first audio data; and playing back the second audio data in substantial synchrony with the video data.

Example 9. The method of any one of the preceding Examples, wherein playing back, via the audio playback device, the first audio data in substantial synchrony with the video data comprises: transmitting, from the audio playback device to a second playback device, at least a portion of the first audio; and playing back, via the second playback device, the at least a portion of the first audio.

Example 10. The method of any one of the preceding Examples, wherein the second playback device comprises a wearable playback device, and wherein playing back, via the audio playback device, the first audio data in substantial synchrony with the video data comprises suppressing playback of the first audio data by the audio playback device while the second playback device plays back the at least a portion of the first audio.

Example 11. A playback device comprising: a first hardware interface configured to be communicatively coupled to an audiovisual content source; a second hardware interface configured to be communicatively coupled to a video display device; one or more processors; one or more audio transducers; and data storage having instructions stored thereon that are executable by the one or more processors to cause the playback device to perform operations comprising: receiving, via the first hardware interface, an input stream of audiovisual content comprising first audio data and video data; tagging the first audio data to generate tagged audio data; transmitting, via the second hardware interface to the video display device, the tagged audio data and the video data; receiving, via the second hardware interface from the video display device, a second audio data stream; evaluating the second audio data to identify a tag; and after identifying the tag: playing back, via the audio playback device, the first audio data in substantial synchrony with the video data; and suppressing playback of the second audio data.

Example 12. The playback device of any one of the preceding Examples, wherein tagging the first audio data comprises downmixing the first audio data such that the tagged audio data has fewer channels than the first audio data.

Example 13. The playback device of any one of the preceding Examples, wherein tagging the first audio data comprises adding predetermined inaudible artifacts to the first audio data.

Example 14. The playback device of any one of the preceding Examples, wherein evaluating the second audio data to identify a tag comprises comparing the tagged audio data and the second audio data.

Example 15. The playback device of any one of the preceding Examples, wherein the first audio data has a first number of audio channels, and wherein the second audio data has a second number of channels fewer than the first, the operations further comprising: generating an error indication that the video display device may have incorrect audio settings.

Example 16. The playback device of any one of the preceding Examples, further comprising: after suppressing playback of the second audio data, continuing to evaluate the second audio stream to identify the tag; after failing to identify the tag within a predetermined period of time (e.g., 10 ms, 50 ms, 100 ms, 500 ms): suppressing playback of the first audio data; and playing back the second audio data in substantial synchrony with the video data.

Example 17. One or more tangible, non-transitory, computer-readable media storing instructions that, when executed by one or more processors of a playback device, cause the playback device to perform operations comprising: receiving, via a first hardware interface of an audio playback device communicatively coupled to a video display device, an input stream of audiovisual content comprising first audio data and video data; tagging the first audio data to generate tagged audio data; transmitting, via a second hardware interface of the audio playback device to the video display device, the tagged audio data and the video data; receiving, via the second hardware interface from the video display device, a second audio data stream; evaluating the second audio data to identify a tag; and after identifying the tag: playing back, via the audio playback device, the first audio data in substantial synchrony with the video data; and suppressing playback of the second audio data.

Example 18. The computer-readable media of any one of the preceding Examples, wherein tagging the first audio data comprises downmixing the first audio data such that the tagged audio data has fewer channels than the first audio data.

Example 19. The computer-readable media of any one of the preceding Examples, wherein tagging the first audio data comprises adding predetermined inaudible artifacts to the first audio data.

Example 20. The computer-readable media of any one of the preceding Examples, wherein evaluating the second audio data to identify a tag comprises comparing the tagged audio data and the second audio data.

Example 21. The computer-readable media of any one of the preceding Examples, wherein the first audio data has a first number of audio channels, and wherein the second audio data has a second number of channels fewer than the first, the operations further comprising: generating an error indication that the video display device may have incorrect audio settings.

Example 22. The computer-readable media of any one of the preceding Examples, further comprising: after suppressing playback of the second audio data, continuing to evaluate the second audio stream to identify the tag; after failing to identify the tag within a predetermined period of time (e.g., 10 ms, 50 ms, 100 ms, 500 ms): suppressing playback of the first audio data; and playing back the second audio data in substantial synchrony with the video data.

The invention claimed is:

1. A method comprising:
   receiving, via a first hardware interface of an audio playback device communicatively coupled to a video display device, an input stream of audiovisual content comprising first audio data and video data;
   tagging the first audio data to generate tagged audio data;
   transmitting, via a second hardware interface of the audio playback device to the video display device, the tagged audio data and the video data;

receiving, via the second hardware interface from the video display device, a second audio data stream comprising second audio data, wherein the first audio data has a first number of audio channels, and wherein the second audio data has a second number of channels fewer than the first;

evaluating the second audio data to identify a tag; and after identifying the tag:

playing back, via the audio playback device, the first audio data in substantial synchrony with the video data;

suppressing playback of the second audio data; and generating an error indication that the video display device may have incorrect audio settings.

2. The method of claim 1, wherein tagging the first audio data comprises downmixing the first audio data such that the tagged audio data has fewer channels than the first audio data.

3. The method of claim 1, wherein tagging the first audio data comprises adding predetermined inaudible artifacts to the first audio data.

4. The method of claim 1, wherein evaluating the second audio data to identify a tag comprises comparing the tagged audio data and the second audio data.

5. The method of claim 1, wherein the audio playback device receives the input stream via an HDMI connection, and wherein the audio playback device transmits the tagged audio data and the video data to the video display device via an eARC connection.

6. The method of claim 1, wherein the audio playback device receives the input stream from one or more of: one or more remote computing devices associated with a media content service, a Blu Ray player, or a DVD player.

7. A method comprising:

receiving, via a first hardware interface of an audio playback device communicatively coupled to a video display device, an input stream of audiovisual content comprising first audio data and video data, tagging the first audio data to generate aged audio data;

transmitting, via a second hardware interface of the audio playback device to the video display device, the tagged audio data and the video data, receiving, via the second hardware interface from the video display device, a second audio data stream comprising second audio data;

evaluating the second audio data to identify a tag; and after identifying the tag:

playing back, via the audio playback device, the first audio data in substantial synchrony with the video data;

suppressing playback of the second audio data after suppressing playback of the second audio data, continuing to evaluate the second audio data stream to identify the tag; and after failing to identify the tag within a predetermined period of time:

suppressing playback of the first audio data; and playing back the second audio data in substantial synchrony with the video data.

8. One or more tangible, non-transitory computer-readable media storing instructions that, when executed by one or more processors of a playback device, cause the playback device to perform operations comprising the method of claim 7.

9. An audio playback device comprising:

the first hardware interface;

the second hardware interface;

one or more processors;

one or more audio transducers; and data storage having instructions stored thereon that are executable by the one or more processors to cause the playback device to perform operations comprising the method of claim 7.

10. A method comprising:

receiving via a first hardware interface of an audio playback device communicatively coupled to a video display device, an input stream of audiovisual content comprising first audio data and video data;

tagging the first audio data to generate tagged audio data;

transmitting, via a second hardware interface of the audio playback device to the video display device, the tagged audio data and the video data;

receiving, via the second hardware interface from the video display device, a second audio data stream comprising second audio data;

evaluating the second audio data to identify a tag; and after identifying the tag:

transmitting, from the audio playback device to a second playback device, at least a portion of the first data, wherein the second playback device comprises a wearable playback device;

playing back, via the second playback device, the at least a portion of the first audio data in substantial synchrony with the video data; and suppressing playback of the first audio data by the audio playback device while the second playback device plays back the at least a portion of the first audio data.

11. One or more tangible, non-transitory computer-readable media storing instructions that, when executed by one or more processors of a media playback system including the audio playback device and the second playback device, cause the media playback system to perform operations comprising the method of claim 10.

12. A media playback system comprising: the audio playback device; the second playback device; one or more processors; and data storage having instructions stored thereon that are executable by the one or more processors to cause the media playback system to perform operations comprising the method of claim 10.

13. A playback device comprising:

a first hardware interface configured to be communicatively coupled to an audiovisual content source;

a second hardware interface configured to be communicatively coupled to a video display device;

one or more processors;

one or more audio transducers; and data storage having instructions stored thereon that are executable by the one or more processors to cause the playback device to perform operations comprising:

receiving, via the first hardware interface, an input stream of audiovisual content comprising first audio data and video data;

tagging the first audio data to generate tagged audio data;

transmitting, via the second hardware interface to the video display device, the tagged audio data and the video data;

receiving, via the second hardware interface from the video display device, a second audio data stream comprising second audio data, wherein the first audio data has a first number of audio channels, and wherein the second audio data has a second number of channels fewer than the first;

evaluating the second audio data to identify a tag; and after identifying the tag:

playing back, via the playback device, the first audio data in substantial synchrony with the video data;

suppressing playback of the second audio data; and generating an error indication that the video display device may have incorrect audio settings.

14. The playback device of claim 13, wherein tagging the first audio data comprises downmixing the first audio data such that the tagged audio data has fewer channels than the first audio data.

15. The playback device of claim 13, wherein tagging the first audio data comprises adding predetermined inaudible artifacts to the first audio data.

16. The playback device of claim 13, wherein evaluating the second audio data to identify a tag comprises comparing the tagged audio data and the second audio data.

17. The playback device of claim 13, further comprising:

after suppressing playback of the second audio data, continuing to evaluate the second audio data stream to identify the tag; and after failing to identify the tag within a predetermined period of time:

suppressing playback of the first audio data; and playing back the second audio data in substantial synchrony with the video data.

18. One or more tangible, non-transitory, computer-readable media storing instructions that, when executed by one or more processors of a playback device, cause the playback device to perform operations comprising:

receiving, via a first hardware interface of an audio playback device communicatively coupled to a video display device, an input stream of audiovisual content comprising first audio data and video data;

tagging the first audio data to generate tagged audio data;

transmitting, via a second hardware interface of the audio playback device to the video display device, the tagged audio data and the video data;

receiving, via the second hardware interface from the video display device, a second audio data stream comprising second audio data, wherein the first audio data has a first number of audio channels and wherein the second audio data has a second number of channels fewer er than the first;

evaluating the second audio data to identify a tag; and after identifying the tag:

playing back, via the audio playback device, the first audio data in substantial synchrony with the video data;

suppressing playback of the second audio data; and generating an error indication that the video display device may have incorrect audio settings.

19. The one or more tangible, non-transitory, computer-readable media of claim 18, wherein tagging the first audio data comprises downmixing the first audio data such that the tagged audio data has fewer channels than the first audio data.

20. The one or more tangible, non-transitory, computer-readable media of claim 18, wherein tagging the first audio data comprises adding predetermined inaudible artifacts to the first audio data.

21. The one or more tangible, non-transitory, computer-readable media of claim 18, wherein evaluating the second audio data to identify a tag comprises comparing the tagged audio data and the second audio data.

* * * * *